US012315367B2

(12) United States Patent
Clifford et al.

(10) Patent No.: US 12,315,367 B2
(45) Date of Patent: May 27, 2025

(54) INTELLIGENT ENTRY AND EGRESS FOR DEDICATED LANE

(71) Applicant: Cavnue Technology, LLC, Brooklyn, NY (US)

(72) Inventors: David Hahn Clifford, Royal Oak, MI (US); Paul Mark de la Vergne, Pleasant Ridge, MI (US)

(73) Assignee: Cavnue Technology, LLC, Arlington, VA (US)

( * ) Notice: Subject to any disclaimer, the term of this patent is extended or adjusted under 35 U.S.C. 154(b) by 481 days.

(21) Appl. No.: 17/476,800

(22) Filed: Sep. 16, 2021

(65) Prior Publication Data

US 2023/0092432 A1 Mar. 23, 2023

(51) Int. Cl.
*G08G 1/01* (2006.01)
*G08G 1/097* (2006.01)

(52) U.S. Cl.
CPC ......... *G08G 1/0145* (2013.01); *G08G 1/0116* (2013.01); *G08G 1/0133* (2013.01); *G08G 1/097* (2013.01)

(58) Field of Classification Search
CPC .. G08G 1/0145; G08G 1/0116; G08G 1/0133; G08G 1/097; G08G 1/0129; G08G 1/015; G08G 1/052; G08G 1/095; G08G 1/075
See application file for complete search history.

(56) References Cited

U.S. PATENT DOCUMENTS 6,643,578 B2 11/2003 Levine
9,718,471 B2 8/2017 Gordon et al.
2017/0345295 A1* 11/2017 Mattar .................. G08G 1/052
2019/0392712 A1* 12/2019 Ran ...................... G08G 1/0116
2020/0223647 A1* 7/2020 Pollak von Emhofen ................. B65G 63/004
2020/0327812 A1 10/2020 Ran et al.
(Continued)

FOREIGN PATENT DOCUMENTS

JP 2010211632 A * 9/2010

OTHER PUBLICATIONS

"Makoto Nishino, Management device, management method and shape detection device, Sep. 24, 2010" (Year: 2010)NPL attached.*
(Continued)

*Primary Examiner* — James M McPherson
*Assistant Examiner* — Bakari Underwood
(74) *Attorney, Agent, or Firm* — Fish & Richardson P.C.

(57) ABSTRACT

Systems and techniques are described for enabling access and egress to dedicated lanes in a vehicular environment. In some implementations, a system include a central server, a gantry system, and a plurality of sensors. The plurality of sensors are positioned in a fixed location relative to a roadway. Each sensor in the plurality of sensors can detect vehicles in a field of view on the roadway. For each detected vehicle, each sensor can generate sensor data and provide the generated sensor data to the gantry system. The gantry system can receive the sensor data and determine whether the detected vehicle can access the dedicated lane based on the received sensor data. In response to determining the detected vehicle can access the dedicated lane, the gantry system can display an entry speed, open a gate to enable the detected vehicle access, and display an access indicator to the detected vehicle.

19 Claims, 4 Drawing Sheets

(56) References Cited

U.S. PATENT DOCUMENTS

| | | | | |
|---|---|---|---|---|
| 2020/0357274 | A1 * | 11/2020 | Soltesz | G08G 1/0133 |
| 2021/0318691 | A1 | 10/2021 | Amini et al. | |

OTHER PUBLICATIONS

Hu et al, "A multirange vehicle speed prediction with application to model predictive control-based integrated power and thermal management of connected hybrid electric vehicles" ASME, 2022, 11 pages.

International Search Report and Written Opinion in International Appln. No. PCT/US2022/043049, mailed on Jan. 4, 2023, 18 pages.

International Preliminary Report on Patentability in International Appln. No. PCT/US2022/043049, mailed Mar. 28, 2024, 12 pages.

* cited by examiner

INTELLIGENT ENTRY AND EGRESS FOR DEDICATED LANE

BACKGROUND

Vehicles can travel on roadways, highways, and back-roads to their destination. In many cases, a vehicle can travel along a road with other vehicles and is positioned behind the other vehicles, next to another vehicle, or in front of another vehicle during its journey. Additionally, vehicles often move positions on the roadway by accelerating, decelerating, or changing lanes. Given the number of vehicles in any given section of road, and the changing speed and positions of the vehicles, collecting and maintaining vehicle speed and position data, and other vehicle data, is a complex and processing intensive task.

SUMMARY

The subject matter of this specification relates to a system that enables access and egress to one or more dedicated lanes in a vehicular environment. In some implementations, the system allows access and egress to the dedicated lanes for both autonomous and human controlled vehicles using a gantry system. The system can configure a specific roadway configuration of lanes to allow a vehicle to enter the dedicated lanes using the gantry system with minimal disruption to surrounding or neighboring vehicles. For example, the system can modify an existing roadway or configure a current roadway to include one or more of a general-purpose lane, an opening lane, a transitional lane, and the dedicated lane. Once employed, the system can monitor aspects of vehicles in the configured roadway to allow for entry and exiting into one or more dedicated lanes based on sensor data generated by sensors positioned along the configured roadway.

More specifically, the technologies described in this application provide for configuring a roadway that allow vehicles to move into and out of a dedicated lane based on positions and movements of vehicles along one or more prior configured roadways. The system can analyze characteristics of vehicles driving on the prior roadways to determine a specific geometric configuration of the configured roadway. In particular, the system can generate and monitor sensor data to describe characteristics of the road actors along certain portions of the prior configured roadways. For example, the system can acquire (i) observations of prevailing speeds of vehicles in general purpose lanes prior to configuration of the roadway; (ii) observations of historic speeds of vehicles along a roadway; (iii) observations of vehicle dynamics; and, (iv) observations of sensor fields of view to ensure vehicles are properly seen at each portion along the configured roadway.

Based on these observations from the sensors, the system generates a specific geometric of the configured roadway that enable a vehicle in traffic to divert from a general-purpose lane to a dedicated lane. In some implementations, the prior roadways can be modified to include the specific lane geometry and act as the newly configured roadway. In other implementations, the system can configure a specific lane geometry without using one or more prior roadways.

Each specific lane geometry has various characteristics of the configured roadway. The various characteristics can describe designs of the general purposes lane, the opening lane, the transition lane, and the dedicated lane. The various characteristics can include a length of a lane, a width of a lane, a number of lanes, a number of turns for each lane, and an angle of the turns for each lane, to name a few examples. The system can configure these lanes using the various characteristics, which can be based on sensor data, historical data, vehicular data, and other roadway configuration data.

In some implementations, the system can include sensors placed in a longitudinal manner along the prior roadways for monitoring the vehicles, their position, and their movement amongst other vehicles. These sensors can communicate with one another, communicate with a central server, and communicate with a gantry system. For example, the sensors can be placed along the prior roadways for acquiring sensor data to aid in generating a configuration for the newly configured roadway.

In response to the system generating and deploying a specific lane geometry for the configured roadway, the system utilizes the sensors, placed in a longitudinal manner along the configured roadway, for monitoring the vehicles, their position, and their movement amongst other vehicles. Each sensor can be spaced at a predetermined distance apart along the side of the road, and each sensor has their own field of view for monitoring a designated area or segment of the road. For example, each sensor may be placed in the ground next to the road and spaced 10 yards apart from one another. In some implementations, the field of view of each sensor may overlap with one another to ensure continuity for viewing the road in its entirety. In other implementations, the field of view of each sensor may not overlap but rather be juxtaposed with one another to ensure the widest coverage of the road. The sensors themselves can include a LIDAR system, a video camera, a radar, a Bluetooth system, and a Wi-Fi system, to name a few examples.

The sensors can, for example, generate observations regarding road actors moving in the general-purpose lanes, the opening lanes, the transition lanes, and the dedicated lanes of the configured roadway. Additionally, the sensors can calculate other characteristics about vehicular traffic, e.g., vehicle density per unit area or vehicle congestion, vehicle headway, and vehicle dynamics. For example, the sensors can identify an object as the object enters its field of view. Based on the identification of the object, the sensors can further describe a location of the vehicles along the configured roadway, a speed of the vehicle, a relationship of the vehicle to another vehicle, e.g., vehicle headway describing distance and time between two moving vehicles, and others, to name a few examples.

In some implementations, the system can monitor and provide the generated sensor data to a gantry system. The gantry system can receive the sensor data from the sensors and use the sensor data to provide information to a vehicle approaching the dedicated lane on the configured roadway. For example, the gantry system can receive sensor data to determine whether to activate one or more of its features. These features that can be activated by the gantry system can include, for example, a gate, a signal indicator, and a speed display to indicate a speed at which an approaching vehicle should move into the dedicated lane.

Generally, vehicles can move along or traverse the configured roadway and can decide whether to use the dedicated lane. For example, a vehicle moving along the general-purpose lane can be informed of a dedicated lane entry point with a display at a set distance prior to the beginning of a transition lane. That vehicle can decide, using an on-board artificial intelligence, for example, to access the dedicated lane by moving into the opening lane and subsequently into the transition lane. In other example, a driver of the vehicle can decide to access the dedicated lane by viewing the display located at the set distance prior to the beginning of the transition lane and make the decision to move into the opening lane and subsequently into the transition lane. The configured roadway can include an opening lane to allow vehicles to merge into a transition lane. As the vehicles travel along the transition lane and toward the gantry system, the sensors can detect one or more vehicles approaching the gantry system based on generated sensor data and the sensors can provide the generated sensor data to the gantry system. The gantry can perform one or more functions based on the provided sensor data from the sensors. For example, the gantry system can provide (i) a signal at the entry of the dedicated lane to indicate whether the vehicle is able to enter the dedicated lane and (ii) a speed display at the entry of the dedicated lane.

The gantry system can determine a type of signal and a speed notification to provide to the approaching vehicle based on characteristics derived from the provided sensor data. For example, the gantry system can determine a vehicle is not moving fast enough towards the dedicated lane, and the gantry system can display a speed warning to the vehicle, indicating the vehicle should speed up to 70 miles per hour. Additionally, the gantry system can turn on a signal to an illuminated state, e.g., a green light, when the vehicle approaches to indicate the vehicle is able to enter the dedicated lane. In another example, the gantry system can determine that a vehicle is unable to enter the dedicated lane based on a vehicle density of the vehicles currently moving through the dedicated lane. In this example, the gantry system can determine that the vehicles have come to a halt, and as such, no further vehicles should enter the dedicated lane at this time. In another example, the gantry system can analyze, using the provided sensor data, an approaching vehicle's headway against a subsequent vehicle in the transition lane. If the gantry system determines that a first vehicle approaching a second vehicle in the transition lane is too close or traveling faster than the second vehicle, then the gantry system can indicate to the second vehicle to increase speed to be able to safely enter a dedicated lane without being hit from behind or deteriorating traffic in the dedicated lane any further. Other examples are also possible.

The gantry system can also indicate a speed to the driver approaching the gantry system based on the provided sensor data. The gantry system can instruct the vehicle to (i) speed up, (ii) slow down, or (iii) remain at constant speed when entering the dedicated lane. Alternatively, the speed can indicate that the driver is not able to enter the dedicated lane.

When the gantry system flashes the signal light to enter the dedicated lane, the gantry system can raise the gate to allow the car to enter the dedicated lane. After the car has entered, the gantry system can close access to the dedicated lane for the next vehicle by closing the gate, until the next vehicle has approached the gantry system within a predetermined distance and the next vehicle has met the requirements for entering the dedicated lane. The gantry system can be placed at an eye level of a driver to improve the visibility of the signal and speed indication for the driver of the vehicle or the cameras of the automated vehicles.

In one general aspect, a method is performed by a system. The method includes: detecting, by each sensor in a plurality of sensors positioned in a fixed location relative to a roadway, vehicles in a first field of view on the roadway, and for each detected vehicle: generating sensor data for the detected vehicle; providing the generated sensor data to a gantry system, wherein the gantry system is configured to provide access to a dedicated lane of the roadway to the vehicles; receiving, by the gantry system, the sensor data; determining, by the gantry system, that the detected vehicle can access the dedicated lane based on the received sensor data; and in response to determining the detected vehicle can access the dedicated lane, (i) displaying, by the gantry system, a speed for the detected vehicle to enter the dedicated lane, (ii) opening, by the gantry system, a gate to enable the detected vehicle access to the dedicated lane, and (iii) displaying, by the gantry system, an indicator indicating the detected vehicle has permission to access the dedicated lane.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, the method includes wherein the roadway comprises one or more of a general purpose lane, an opening lane, a transition lane, and the dedicated lane.

In some implementations, the method includes acquiring, by the plurality of sensors, sensor data of the vehicles traveling along a prior roadway; transmitting, by the plurality of sensors, the acquired sensor data to a central server; receiving, by the central server, the acquired sensor data from each sensor of the plurality of sensors; determining, by the central server, using the acquired sensor data: (i) prevailing speeds of the vehicles traveling along the prior roadway over a period of time, (ii) historic speeds of the vehicles traveling along the prior roadway over the period of time, (iii) vehicle dynamics of the vehicles traveling along the prior roadway over the period of time, and (iv) a visibility of the plurality of sensors to view an entire prior roadway; and in response, determining, by the central server, a specific configuration of the roadway based on the prevailing speeds, the historic speeds, the vehicle dynamics, and the visibility of the plurality of sensors of the one or more vehicles on the prior roadway.

In some implementations, the method includes wherein detecting the vehicles in a first field of view on the roadway further includes: detecting the vehicles in the first field of view on a general purpose lane of the roadway; detecting the vehicles in a second field of view on an opening lane of the roadway; detecting the vehicles in a third field of view on a transition lane of the roadway; and detecting the vehicles in a fourth field of view on a dedicated lane of the roadway.

In some implementations, the method includes wherein detecting the vehicles in a first field of view on the roadway further includes: determining vehicle densities of the vehicles in each of the first, second, third, and fourth fields of view; determining vehicle headways of the vehicles in each of the first, second, third, and fourth fields of view; and determining vehicle motions of the vehicles in the fourth field of view corresponds to normal vehicular movement based on a threshold, the threshold determined using prior vehicle dynamics and prior historic speeds of the vehicles.

In some implementations, the method includes wherein the gantry system comprises a gate, a signal indicator, and a speed indicator.

In some implementations, the method includes wherein displaying the indicator indicating the detected vehicle has permission to access the dedicated lane further includes: based on the received sensor data, the gantry system: determining the detected vehicle is approaching the gantry system in a transition lane; determining the detected vehicle approaching the gantry system includes a headway with one or more other surrounding vehicles that enables safe acceleration to a prevailing speed in the dedicated lane; determining the detected vehicle approaching the gantry system and other vehicles in the dedicated lane are driving in a safe fashion; and determining a vehicle density of one or more other vehicles in a dedicated lane of the roadway is less than a threshold amount; and in response, displays a light of the indicator indicating the detected vehicle has permission to access the dedicated lane.

In some implementations, the method includes wherein displaying the speed for the detected vehicle to enter the dedicated lane further includes: based on the received sensor data: in response to displaying the light of the indicator, determining, by the gantry system, the speed for the detected vehicle to enter the dedicated lane based on the headway of the detected vehicle with the one or more surrounding vehicles that enables the safe acceleration of the vehicle to the prevailing speed; and displaying, by the gantry system, the speed for the detected vehicle to enter the dedicated lane of the roadway.

In some implementations, the method includes: based on the received sensor data: determining, by the gantry system, the detected vehicle approaching the gantry system in a transition lane of the roadway is traveling at a speed greater than a threshold value; determining, by the gantry system, the detected vehicle cannot access the dedicated lane unless the vehicle meets a speed equivalent to the threshold value; and displaying, by the gantry system, the speed equivalent to the threshold value for the detected vehicle; receiving, by the gantry system, additional sensor data from the plurality of sensors, the additional sensor data indicating a new speed of the detected vehicle matches or is below the speed equivalent to the threshold value while traveling in the transition lane; and opening, by the gantry system, the gate to enable the detected vehicle access to the dedicated lane.

In some implementations, the method includes: based on the received sensor data: detecting a second vehicle approaching the gantry system, wherein the second vehicle is behind the detected vehicle in a transition lane of the roadway; determining a first speed of the detected vehicle; determining a second speed of the second vehicle; determining the second speed is greater than the first speed by a threshold amount; and displaying a third speed for the detected vehicle to meet to be able to access the dedicated lane of the roadway; receiving additional sensor data from the plurality of sensors, the additional sensor data indicating a new speed of the detected vehicle matches, is above, or is below the third speed within a threshold value; and opening the gate to enable the detected vehicle access to the dedicated lane.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
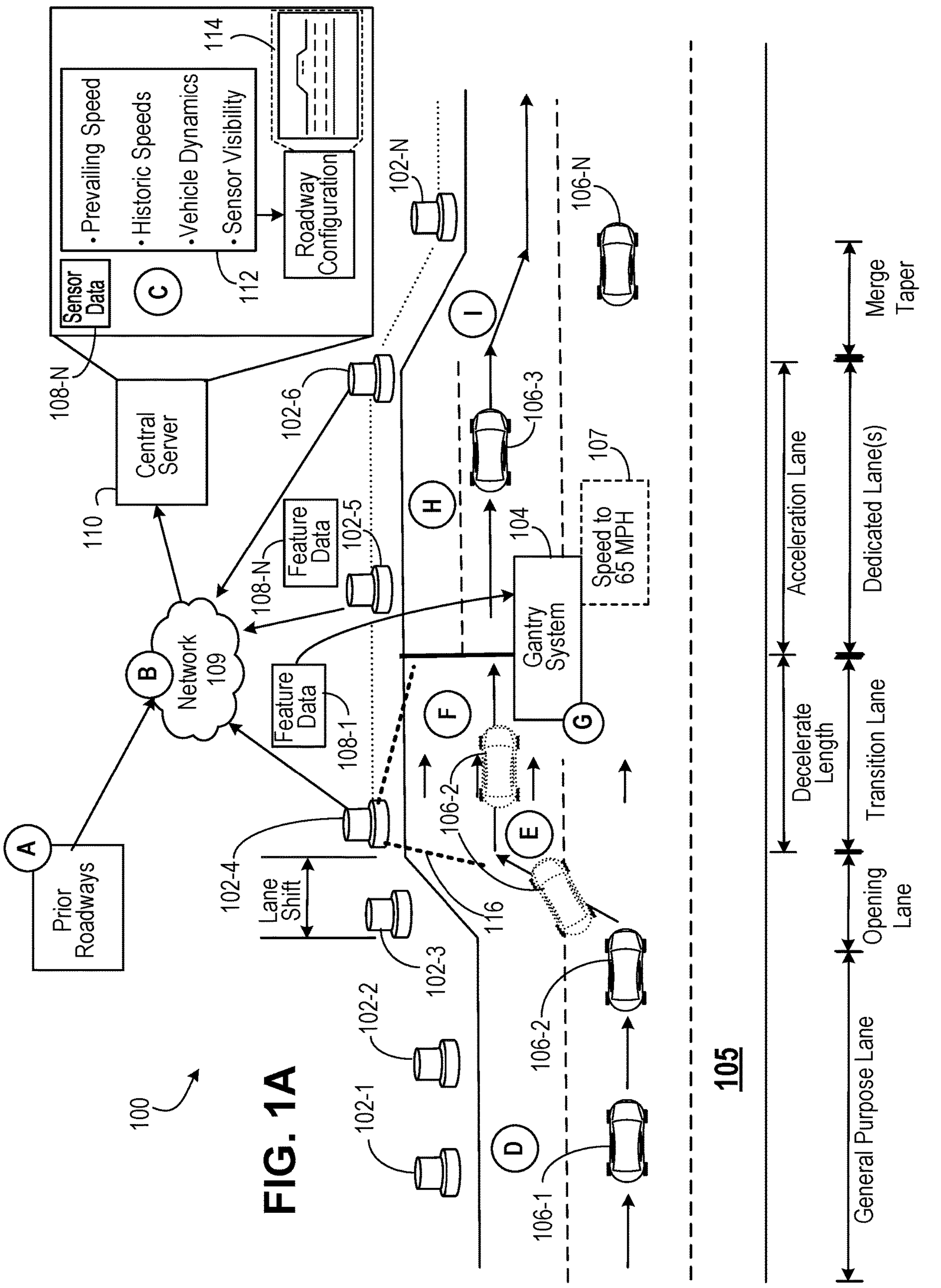
FIGS. 1A-1C are block diagrams that illustrate an example of systems that enable access and egress to one or more dedicated lanes.

FIG. 1A is a block diagram that illustrates an example of system 100 that enables access and egress to one or more dedicated lanes. The system 100, deployed upon a road 105 on which vehicles 106-1 through 106-N travel, includes a plurality of sensors 102-1 through 102-N, a gantry system 104, a network 109, and a central server 110. In this example, the system 100 illustrates the processes performed by the sensors 102-1 through 102-N, the central server 110, and the gantry system 104. The system 100 illustrates seven sensors and four vehicles, but there may be more or less sensors and more or less vehicles in other configurations. Additionally, the road 105 is shown in system 100 with multiple lanes in a single direction. The road 105 may alternatively or additionally include a greater number of lanes having vehicles travel in the same direction as well as more than one lane of vehicles traveling in opposing directions. FIG. 1A illustrates various operations in stages (A) through (H), which can be performed in the sequence indicated or another sequence.

In general, the system 100 can provide the techniques for monitoring vehicles on the road 105 and providing the vehicles with access and egress to one or more dedicated lanes. The sensors 102-1 to 102-N, e.g., collectively, “sensors 102”, can acquire sensor data regarding a particular road actor, e.g., vehicle, moving on the road 105 in a particular direction. The system 100 can generate and monitor sensor data that can not only describe the vehicle but can also illustrate by way of a representation of the vehicle in a lane, the speed of that vehicle, speed headway of the vehicle, and the relationship of that vehicle to other vehicles on a per frame basis. Moreover, the system can generate and monitor sensor data in a similar manner for multiple vehicles. Examples of the objects or road actors that the system 100 can detect and identify can include a vehicle, such as a car, a semi-truck, a motorcyclist, and even a bicyclist. The system can also identify a person that is moving along the road 105, such as along the sidewalk adjacent to the road or crossing the street. The system can identify other objects that present itself on the road 105, such as a pet or an obstruction that may impede the flow of traffic.

The sensors 102 can include a variety of software and hardware devices that monitor objects on road 105. For example, the sensors 102 can include a LIDAR system, a video camera, a radar system, a Bluetooth system, and a Wi-Fi system to name a few examples. A sensor can include a combination of varying sensor types. For example, sensor 102-1 can include a video camera and a radar system; sensor 102-2 can include a video camera and a radar system; and, sensor 102-N can include a video camera, a LIDAR system, and a Wi-Fi system. Other sensor combinations are also possible.

A sensor can detect and track objects on the road 105 through its field of view. Each sensor can have a field of view set by the designer of the system 100. For example, if sensor 102-1 corresponds to a video camera, the field of view of the video camera can be based on the type of lens used, e.g., wide angle, normal view, and telephoto, for example, and the depth of the camera field, e.g., 20 meters, 30 meters, and 60 meters, for example. Other parameters for each sensor in system 100 can also be set. For example, if the sensor 102-2 corresponds to a LIDAR system, the parameters required for use would include the point density, e.g., a distribution of the point cloud, field of view, e.g., angle in which the LIDAR sensor can view, and line overlap, e.g., a measure to be applied that affects ground coverage. Other parameters for each of the sensors are also possible.

The field of view of each sensor becomes important because the system 100 can be designed in a variety of ways to enhance monitoring of objects on the road 105. For example, a designer may seek to overlap fields of view of adjacent sensors 102 to ensure continuity for viewing the road 105 in its entirety. Additionally, overlapping field of view regions may facilitate monitoring areas where objects enter the road 105 through vehicle on-ramps or exit the road 105 through vehicle off-ramps. In other another example, the designer may decide not to overlap the fields of view of adjacent sensors 102 but rather, juxtapose the fields of view of adjacent sensors 102 to ensure the widest coverage of the road 105. In this manner, the system 100 can monitor and track more vehicles at a time.

In addition, each sensor can include memory and processing components for monitoring the objects on the road 105. For example, each sensor can include memory for storing data that identifies and tracks the objects identified in the order the vehicles appear to a sensor. The processing components can include, for example, video processing, sensor processing, transmission, and receive capabilities. Each of the sensors can also communicate with one another over the network 109. The network 109 may include a Wi-Fi network, a cellular network, a Bluetooth network, an Ethernet network, or some other communicative medium.

The sensors 102 can also communicate with a central server 110 over network 109. The central server 110 can include one or more servers and one or more databases connected locally or over a network. The central server 110 can store data that represents the sensors 102 in the system 100. For example, the central server 110 can store data that represents the sensors 102 that are available to be used for monitoring. The data indicates which sensors 102 are active, which sensors 102 are inactive, the type of data recorded by each sensor, and data representing the fields of view of each sensor. Additionally, the central server 110 can store data identifying each of the sensors 102 such as, for example, IP addresses, MAC addresses, and preferred forms of communication to each particular sensor. The data can also indicate the relative positions of the sensors 102 in relation to one another. The data can also indicate the relative positions of the sensors 102 in relation to one another. In this manner, a designer can access the data stored in the central server 110 to learn what sensors 102 are being used to monitor the objects on the road 105 and pertinent information for each of these sensors 102.

In some implementations, the central server 110 can generate a roadway configuration that enables access and egress to one or more dedicated lanes in vehicular environment. The roadway configuration can enable both autonomous and human controlled vehicles to access the dedicated lanes using a gantry system, which will be further described below. The specific roadway configuration of lanes can allow one or more vehicles to enter the dedicated lanes using the gantry system with minimal disruption to surrounding vehicles, neighboring vehicles, or vehicles already driving within the dedicated lanes. For example, the central server 110 can modify an existing roadway to generate a new roadway configuration that enables access and egress to the dedicated lanes. Alternatively or additionally, the central server 110 can generate a new roadway configuration for enabling access and egress to the dedicated lanes.

The central server 110 can generate the roadway configuration that includes various roadways and characteristics. The various roadways can include general-purpose lanes, opening lanes, transitional lanes, and dedicated lanes. As shown in the example of system 100, the road 105, which corresponds to a configured roadway by the central server 110, includes three general-purpose lanes, two opening lanes, two transition lanes, and two dedicated lanes. In other example, the number of each lanes for the roadway configuration may vary, depending on the central server 100's generation of the roadway configuration. For example, the number of lanes for each roadway section can range from 1 to N. The central server 110 can also determine a number of characteristics associated with the various roadways. These characteristics can include a length of a lane, a width of a lane, a number of lanes, a number of turns for each lane, and an angle of the turns for each lane, to name a few examples. The system can configure these lanes using the various characteristics. The central server 110 can generate the roadway configuration with the various characteristics based on obtained sensor data, historical data, vehicular data, and other roadway configuration data.

A general-purpose lane can correspond to a lane that is driven on by the public without any restrictions or tolls. For example, the general-purpose lane can include a lane that a driver can drive freely towards their destination. The opening lane can correspond to a lane that enables vehicles to move between the general-purpose lane and the transition lane. The transition lane can correspond to a lane that enables the driver to approach the gantry system. The dedicate lane can correspond to a lane that enables the driver with special access following meeting conditions or criteria set by the gantry system.

In order for the central server 110 to generate the roadway configuration, the central server can analyze position, movements, and other characteristics of vehicles along one or more prior configured roadways. The central server 110 can analyze characteristics of vehicles driving on the prior roadways to determine a specific geometric roadway configuration that enables vehicles to access and egress dedicated lanes. Specifically, the system 100 can generate and monitor sensor data over time to describe characteristics of the road actors along certain points of the prior configured roadways. For example, the central server 110 can acquire from prior roadways configured with sensors: (i) observations of prevailing speeds of vehicles in general purpose lanes; (ii) observations of historic speeds of vehicles along a roadway; (iii) observations of vehicle dynamics; and, (iv) observations of sensor fields of view to ensure vehicles are properly seen at each portion along the configured roadway. The central server 110 can obtain sensor data from sensors monitoring the one or more prior configured roadways. Based on the sensor data, the central server 110 can generate a specific geometric configuration of a new roadway that enables vehicles in traffic to divert from the general-purpose lane to access and egress one or more dedicated lanes.

After the central server 110 has generated and deployed the roadway configuration, e.g., by way of construction of the newly generated roadway configuration or another form of deployment, the system 100 can monitor aspects and characteristics of vehicles in the configured roadway to allow for entry and exiting into the one or more dedicated lanes based on sensors 102 positioned along the configured roadway. The system can also deploy sensors 102 placed in a longitudinal manner along the newly configured roadway monitoring the vehicles, their position, and their movement amongst other vehicles. These sensors 102 can communicate with one another, communicate with the central server 110, and communicate with a gantry system 104.

The sensors 102 can generate observations regarding road actors moving in the newly configured general-purpose lane, the opening lane, the transition lane, and the dedicated in road 105. Additionally, the sensors 102 can calculate other characteristics about vehicular traffic in their corresponding fields of view, e.g., vehicle density per unit area or vehicle congestion, vehicle headway, and vehicle dynamics. For example, the sensors 102 can identify an object as the object enters its field of view. Based on the identification of the object, the sensors 102 can further describe a location of the vehicles along the configured roadway, a speed of the vehicle, a relationship of the vehicle to another vehicle, e.g., vehicle headway describing distance and time between two moving vehicles, and others, to name a few examples.

The sensors 102 can also communicate with the gantry system 104 over network 109. The gantry system 104 can include a gate, a signal indicator, and a display screen 107 configured to display speeds at which vehicles should drive through the transition and dedicated lanes. The gantry system 104 can receive sensor data from the sensors 102 on a periodic basis or another basis, e.g., when a road actor is detected, and in response, the gantry system 104 can take action. In particular, the gantry system 104 can determine from the sensor data that a vehicle has moved from the general-purpose lane to an opening lane, and subsequently, moved from the opening lane to the transition lane. The gantry system 104 can determine that the vehicle driving through the transition lane is seeking access to the one or more dedicated lanes. The gantry system 104 can include a gate that blocks the vehicles access to the one or more dedicated lanes until one or more conditions have been met. The gate can be positioned between the transition lane and the one or more dedicated lanes.

In other implementations, a server may perform the processing for the gantry system 104. For example, the central server 110 may perform each of the processing functions of the gantry system 110 as described throughout the specification. The central server 110 may receive the sensor data from the sensors 102 and instruct the gantry system 102 to activate the gate, illuminate a particular light on the signal indicator, and provide a message to the display screen 107, based on the received sensor data. In some cases, a server other than the central server 110 may perform the processing of the gantry system 104, such as a remote server connected over the network 109. The remote server may perform processing using sensor data received from the sensor 102 and instruct the gantry system 104 to perform functions such as, for example, allowing vehicles to enter the dedicated lanes, opening the gate, illuminating a light, or not allowing vehicles to enter the dedicated lanes, to name a few examples.

In some implementations, the gantry system 104 can determine a type of signal and a speed notification to provide to the approaching vehicle based on characteristics derived from the obtained sensor data. For example, the gantry system 104 can determine that a vehicle is not moving fast enough towards the one or more dedicated lanes. In response, the gantry system 104 can display a speed warning to the vehicle, indicating that the vehicle is requested to speed up in the transition lane. Once the gantry system has determined that the vehicle has sped up to the requested speed through acquired sensor data while in the transition lane, the gantry system can turn on a signal to an illuminated state, e.g., a green light, when the vehicle approaches to indicate the vehicle is able to enter the dedicated lane. Additionally, the gantry system can raise the gate to allow the vehicle access to the one or more dedicated lanes and close the gate after the vehicle has accessed the one or more dedicated lanes to ensure the next vehicle cannot access the one or more dedicated lanes until one or more conditions have been met. Other examples with the gate, the speed indicator, and the display associated with the gantry system 104 will be further described below.

During stage (A), the sensors currently deployed at prior roadways can generate sensor data. The sensors can be deployed longitudinally along the prior roadways to generate and monitor sensor data of road actors. The central server 110 can subsequently use this generated sensor data to generate a new roadway configuration.

The prior roadways can include various roads monitored by sensors. For example, the prior roadways can include exit ramps, entry ramps, general-purpose lanes, high occupancy vehicle (HOV) lanes, highways, back roads, side streets, and other roads. The other roads can include different types of various capacity roads, larger roads, private roads, intersecting roads, and other thoroughfares that sensors displaced along these roads can generate sensor data. The sensors positioned along these roads can generate sensor data as they detect road actors traveling along these roads. For example, the sensor data can correspond to an identification of a vehicle type, characteristics of detected vehicles, vehicular density per unit area, vehicular congestion, vehicle headway, and vehicle dynamics.

The identification of the vehicle type can correspond to, for example, a truck, a sedan, a minivan, a hatchback, an SVU, and others. The identification of the vehicle type can be based on a size of the vehicle. Characteristics of the vehicle can include, for example, vehicle color, vehicle size, wheelbase distance, and length, height, and width of vehicle. Vehicular density per unit area can correspond to a number of vehicles measured over a particular area in traffic. Vehicular congestion can correspond to a measure of an amount of traffic and movement rate of the traffic in a particular area. Vehicle headway can correspond to a distance between a first and second vehicle in a transit system measured in time or in distance. Vehicle dynamics can include acceleration, deceleration, and velocity of one or more vehicles traveling along the prior roadways over a period of time.

In some implementations, the sensors deployed at each of these prior roadways can generate the sensor data at various intervals. For example, each time a sensor detects a vehicle in its field of view, the sensor can generate the sensor data. In response to generating the sensor data, the sensor can transmit the generated sensor data to the next sensor in the longitudinal direction along the same roadway to confirm that it also detects similar sensor data. The next sensor can pass its generated sensor data to the next sensor down the longitudinal line on the prior roadway to ensure it sees similar vehicles. In this manner, the generated sensor data is highly accurate because each sensor on the prior roadway can confirm the prior's sensor generated sensor data. In other examples, the sensors can generate sensor data on a time basis, such as every 2 seconds. On the time basis, the sensors may reduce their bandwidth and processing, but ultimately include less accurate sensor data results.

During stage (B), the sensors at each of the prior roadways can transmit their respective sensor data to the central server 110 over network 109. The sensors can transmit their respective sensor data to the central server 110 each time a new object is detected on the prior roadway. In another example, the sensors can transmit their respective sensor data when a sensor receives confirmation from the next sensor down the longitudinal line of sensors. As mentioned above, when a sensor generates sensor data at a roadway, the sensor transmits the generated sensor data to the next sensor along the roadway. The next sensor can generate sensor data of the detected road object and compare the received sensor data from the prior sensor with the newly generated sensor data. If the generated sensor data matches, then the next sensor can transmit a confirmation to the prior sensor indicating a match in generated sensor data. The match may be within some threshold value, in the case that a road actor changes positions on the road, which ultimately affects the distance between a sensor and the road actor. At this point, when the prior sensor receives the confirmation data, the prior sensor can transmit the sensor data to the central server 110 over the network 109. A confirmation can greatly increase the accuracy of the generated sensor data.

In other cases, each of the sensors can transmit the generated sensor data at various intervals. For example, each of the sensors can transmit the sensor data every one hour, every few hours, or at the end of every day. More periodic approaches for sensor data transmission can reduce the amount of bandwidth consumed by network 109 for network traffic. Additionally, the sensors may transmit the sensor data over network 109 to a database associated with the central server 110. In this case, the database can store the sensor data in a cloud architecture, for example, and the central server 110 can access the stored sensor data in the database on the cloud architecture on an as needed basis.

The generated sensor data can not only include data regarding detected road actors, but also data identifying the sensors and data identifying the prior roadways that the sensors are monitoring. The data identifying the sensors can include, for example, a type of sensor, the data generated by the sensor, IP addresses of the sensor, and MAC addresses of the sensor. The data identifying the prior roadways can include a coordinate position of the sensor, data identifying the road type, e.g., highway, city street, backroad, exit ramp, etc., and other data regarding the prior roadways. The data identifying the sensor, the data identifying the prior roadways, and the generated sensor data from the sensor can be collocated in the database or provided to the central server 110 as a package.

During stage (C), the central server 110 can receive the sensor data 108-N from each of the sensors associated with the prior roadways. In other examples, the central server 110 can access the database for generated sensor data 108-N associated with the prior roadways. The central server 110 can generate characteristics from the generated sensor data 108-N regarding vehicular characteristics 112 along the prior roadway. The vehicular characteristics 112 can include, for example, prevailing speeds of the vehicles, historic speeds of the vehicles, vehicle dynamics, sensor visibility, and others.

The central server 110 can then configure a new roadway—114 from the generated sensor data 108-N and the vehicular characteristics 112. The new roadway configuration 114 can correspond to a new roadway or a modification to an existing roadway. The central server 110 seeks to generate a new roadway configuration 114 that enables vehicles to more easily divert from a general-purpose lane to access and egress one or more dedicated lanes.

In some implementations, the central server 110 can acquire sensor data 108-N from the same prior roadway. The central server 110 can be configured to acquire sensor data 108-N from sensors associated with the same prior roadway. Moreover, the central server 110 can acquire the sensor data 108-N associated with the same prior roadway from the same period of time. By analyzing sensor data 108-N from sensors over the same period of time, the central server 110 can gain an understanding of how vehicles move along the prior roadway. This movement can include, speed at which vehicles travel, how vehicles change lanes, and how vehicles maneuver through other vehicles on this prior roadway.

The central server 110 can determine the prevailing speeds of the vehicles along the prior roadway. The prevailing speed can correspond to the speed at which 85 percent of the vehicles are traveling at or below that speed, for example. The central server 110 can use the calculated prevailing speed as a reference to establish speed limits based on the idea that vehicles can be relied upon to drive at a reasonable speed. The central server 110 can also determine historic speeds of the vehicles for the prior roadways. The historic speeds of the vehicles can correspond to a speed at which vehicles traveled over the prior roadway over a prior period of time. For example, the historic speeds can include an average speed, a maximum speed, a minimum speed, and an amount of time in which vehicles did not move. The central server 110 can also determine vehicle dynamics over prior periods of time corresponding to the prior roadways. The vehicle dynamics can include vehicle acceleration and deceleration of vehicles over time on the prior roadways.

The central server 110 can also determine sensor visibility from the acquired sensor data. For example, the sensor visibility can indicate to the central server 110 a field of view of the sensor and whether the sensor can accurately see the road actors on the prior roadways. For example, if the central server 110 determines that the sensor is too close to the prior roadway or that the sensor is not angled properly to see the road actors on the prior roadway, the central server 110 can determine an adjustment to be made to the sensors during the configuration of the new roadway to ensure sensor visibility. In another example, the central server 110 can determine that the sensor is too close to another sensor, as the sensors share overlapping fields of view. The central server 110 can determine that the sensors on the newly configured roadway need to be spaced farther apart so the fields of view are juxtaposed and not overlapped.

Additionally, the central server 110 can determine from lanes that include exit ramps an amount of congestion. The amount of congestion in one or more lanes that contain one or more exit ramps can indicate to the central server 110 whether an issue exists with the current lane configuration. For example, if a large amount of congestion exists, the central server 110 may determine that only two lanes exist, one of those lanes leads directly to an exit ramp, and that one lane does not continue after the exit ramp, leading to only a one-lane road. In this case, the central server 110 may design a new roadway configuration that includes three lanes, one of the three lanes leads to an exit ramp but that lane continues onward after the exit ramp, thus, maintaining the three-lane road configuration and ultimately reducing overall traffic.

The central server 110 may also determine causes for congestion. For example, if a lane configuration includes one or more exit ramps, but a road that leads to the exit ramp is too short, then vehicles in the opposite lane may need to cross the lane configuration to reach the exit ramp. This crossing of the lane configuration may cause traffic jams, congestion, and even vehicle accidents. The central server 110 can seek to generate a new roadway configuration 114 that includes a lane with a long distance for leading to an exit ramp. With the length of the lane being long, the central server 110 can ensure that vehicles have sufficient time to move across general-purpose lanes to access the exit ramp without causing congestions and/or traffic jams.

In some implementations, the central server 110 can aggregate sensor data 108-N across multiple prior roadways to aid in generation of the newly configured roadway 114. For example, the central server 110 can generate the vehicle characteristics 112 that include prevailing speeds of the vehicles, historic speeds of the vehicles, vehicle dynamics, and sensor visibilities corresponding to each of the prior roadways across multiple periods of time. Moreover, the central server 110 can determine congestion scores of traffic across each of the prior roadways and determine hazard associated with lane conditions. In this manner, the central server 110 can seek to determine a new roadway configuration 114 that reduces congestion scores of traffic and minimizes hazards associated with lane conditions. For example, one manner in which the central server 110 can generate a roadway configuration 114 that reduces congestion scores of traffic and minimizes hazard associated with lane conditions can include roadways that ensure vehicles do not need to cut across a few lanes of traffic and quickly decelerate when accessing an exit ramp. Another example can include ensuring that a vehicle can access the exit ramp while moving at a comfortable pattern, e.g., comfortable speed and acceleration or deceleration, without disrupting the flow of traffic and not generating a large amount of jerk or gravitational forces the vehicle.

In other examples, the central server 110 can determine from the aggregate sensor data 108-N to determine whether road actors or vehicles are utilizing an exit ramp in the corresponding prior roadways in a consistent fashion. For example, the central server 110 can determine whether the road actors are driving in an erratic or stochastic fashion, and whether this stochastic style of driving is occurring because of a lane configuration including the exit ramp or the drivers themselves acting erratically. The central server 110 can flag prior lane configurations that appear to cause vehicles to move erratically as lane configurations not to include in the new lane configuration 114.

In some implementations, the central server 110 can generate the new lane configuration 114 after analyzing the aggregate sensor data 108-N. The central server 110 can determine a new lane configuration 114 that includes one or more general purpose lanes, one or more opening lanes, one or more transition lanes, and one or more dedicated lanes. The central server 110 can review the aggregate sensor data 108-N and ensure any flagged lane configurations that cause abnormal, unsafe, or hazardous driving behavior are not included within the newly generated lane configuration 114. Moreover, the central server 110 can ensure that any lane configurations that cause a high amount of congestion or traffic are not included within the new lane configuration 114.

When generating the new lane configuration 114, the central server 110 can determine road characteristics of the one or more general-purpose lanes, one or more opening lanes, one or more transition lanes, and one or more dedicated lanes. The road characteristics can include a length of each lane, a number of lanes, a width of each of the lanes, a number of turns of the lanes, an incline, decline, or flatness associated with each of the lanes, an angle of each of the turns (if any), and data that accounts for positioning of the gantry system 104. The central server 110 can generate the new lane configuration 114 that reduces or minimizes the amount of hazard or unsafe conditions caused to vehicles as the vehicles transition from the general-purpose lane(s) to the dedicated lane(s) through the gantry system 104.

For each of the general purpose, opening, transition, and dedicated lanes of the new lane configuration, the central server 110 can apply the road characteristics that ensure minimal hazard to vehicles. For example, the central server 110 can ensure that the general purpose lane includes three lanes, the lanes have a length of 1000 feet because 1000 feet length appear to reduce congestion and traffic for vehicles on the prior roadways. Moreover, the central server 110 can ensure that the opening lane has a length of 840 feet and a width of four lanes because this amount of lanes and lane length allows vehicles to access the dedicated lanes with ease from any of the general purpose lanes without causing a high amount of traffic and a low congestion score. The central server 110 can determine that the length of the transition lane is 615 feet and includes only one lane.

These characteristics of the transition lane ensure the vehicles can properly access the dedicated lane(s) by meeting various conditions of the gantry system 104 and ensure that only one vehicle accesses the dedicated lanes at a time. The central server 110 can also determine that the length of the dedicated lane(s) can correspond to 1620 feet to enable vehicles to properly accelerate to a designated speed of the dedicated lane without causing disruption to other vehicles within the dedicated lane. Lastly, the central server 110 may apply another lane, known as a merge taper lane, which enables vehicles to move from the dedicated lanes to the general-purpose lanes. The length of the merge taper lane can correspond to 840 feet, for example. The lengths and number of lanes associated with each of the general purpose, opening, transition, dedicated, and merge taper as described above can include other values based on the acquired sensor data and corresponding determinations that enable minimizing vehicle hazards.

During stage (D), the central server 110 can deploy the new roadway configuration 114. In some implementations, the central server 110 can deploy the new roadway configuration by modifying an existing roadway. In other implementations, can deploy the new roadway configuration by implementing a new roadway configuration. For example, the central server 110 can generate a blueprint of plans for the new roadway configuration 114 and provide the blueprint of plans to be used for construction of a new road 105. In some example, a user can access the central server 110 to review the roadway configuration 114 and deploy or build the new road 105 based on the roadway configuration 114. The new road 105 can be built from the roadway configuration 114 by way of building a new road or modifying an existing roadway. In some examples, the construction of the new road 105 from the roadway configuration 114 can be built in flat areas to ensure that other hazard risks are not incurred by drivers, e.g., blind spots coming down a hill, blind spots coming up hill, and hazards due to weather if inclines or declines exist.

As illustrated in system 100, the new road 105 can include three general-purpose lanes, three opening lanes, two transition lanes, two dedicated lanes and two merge taper lanes. In some implementations, the new roadway configuration 114 may not include merge taper lanes. As previously mentioned, the central server 110 can also determine other numbers of lanes for the new road 105 and other roads. Within the transition lane, vehicles can decelerate. Within the one or more dedicated lanes, the vehicles can accelerate to a particular speed within the dedicated lanes. Moreover, the deployment of the roadway configuration 114 can also include a deployment of sensors 102 and a gantry system 104. For example, the deployment of sensors 102 can include sensors 102 that monitor the road actors on the road 105. The sensors 102 can be deployed in a longitudinal manner along the road 105 such that each sensor's field of view can view a portion of the road 105. In another example, each sensor's field of view may overlap with proximate sensors. The sensors may also be angled to maximize the viewing of the road 105 and its road actors.

Once the sensors have been deployed, the road 105 is ready for use by vehicles. For example, sensor 102-1 can detect that vehicle 106-1 has entered its field of view. The sensor 102-1 can record media of a segment of portion of the road 105 and process the media using object detection or some other form of classification to detect a moving object. The object detection can correspond to a vehicle, a person, an animal, or an object. The object may be stationary or may be moving. In the example of system 100, the sensor 102-1 can detect and classify vehicle 106-1 in the general-purpose lanes of road 105. The sensor 102-1 will have already processed vehicles 106-2, 106-3, and 106-N.

In some implementations, each of the sensors 102 can detect vehicle 106-1 by performing data aggregations of observations over a window of time. The data aggregations improve the sensors' detectability of the vehicle 106-1 in its field of view. Additionally, the data aggregation can ensure that each sensor will identify and detect similar vehicles and their corresponding features.

The sensor 102-1 can then identify one or more features of the vehicle 106-1 detected in its field of view. These features can include observable properties of the vehicle, such as the vehicle color, e.g., as represented by red-green-blue (RGB) characteristics, the vehicle size, e.g., as calculated through optical characteristics, the vehicle class, e.g., as calculated through optical characteristics, and the volume of the vehicle, as calculated through optical characteristics. For example, the sensor 102-1 can determine that vehicle 106-1 is a red colored vehicle, is over 120 $ft^3$ in size, has a vehicle type of a sedan, and is a medium sized vehicle. The sensor 102-1 may also be able to determine one or more characteristics of the vehicle, such as its rate of speed, the distance away from the sensor 102-1, the vehicle 106-1's direction of travel, and a number of individuals found in the vehicle 106-1, to name a few examples.

In some implementations, the types of components found at the particular sensor that detect the vehicle determine the characteristics that describe the vehicle. For example, sensor 102-1 may include a video camera and a radar system. The sensor 102-1 can then determine characteristics using the media recorded from the video camera and the electromagnetic reflectivity from the radar system. For example, the sensor 102-1 can determine color of the object, size of the object, distance from the object, rate of movement of the object, and direction of movement of the object. However, if the sensor 102-1 does not include the radar system, the sensor 102-1 can use other external components to determine the distance from the object, rate of movement of the object, and direction of movement of the object. For example, the sensor 102-1 may be able to utilize an external classifier to produce these results. The external classifier may be stored at the sensor 102-1 or stored at a location accessible to the sensor 102-1 over network 109. Thus, the system 100 can benefit from having a combination of components to improve the detection process found at each of the sensors.

In some implementations, the sensor 102-1 can generate other feature data on the sensor data using sensor fusion. For example, in the case where sensor 102-1 utilizes multiple components, e.g., LIDAR, radar, and a video camera, the sensor 102-1 can combine the observation from each of these components and assign these observations to a point in space. The point in space can correspond to an N-dimensional value that describes the feature. Then, the sensor 102-1 can use features to calculate and classify that particular point in space. For example, the sensor 102-1 can enjoin data from the LIDAR system, the radar system, and the video camera. The LIDAR system can generate 1 point per centimeter for 150-meter range for viewing the road 105, for example. The radar system can perform calculations that estimate where the vehicle or object is located in relation to the radar system. The video camera can estimate a volumetric projection of the identified object or vehicle based on a volumetric projection estimation algorithm. The sensor 102-1 can then calculate an identity product, e.g., the feature data, using the observations from each of these sensors, which can correspond to a hash of the observations. For example, the sensor 102-1 can calculate an identity product of the feature data and a timestamp the features were identified, from data provided by each of the sensors.

Then, the sensor 102-1 can transmit data representing the identity product of the feature data to the next sensor in the direction of traffic, e.g., sensor 102-2. The sensor 102-1 may transmit the data representing the identity product of the feature data when vehicle 106-1 has exited sensor 102-1's field of view. The data representing the identity product of the feature data can include, for example, a data structure, a matrix, or a link to data stored in a database. The sensor 102-1 can determine which sensor is the next sensor in a longitudinal line along the road 105. In some implementations, the sensor 102-1 may determine the next sensor by checking an order of the sensors. In other implementations, the sensor 102-1 may request from the central server 110 to indicate which sensor is the next sensor to receive the data. In response to receiving an indication from the central server 110 indicating which sensor to transmit the data, e.g., sensor 102-2, the sensor 102-1 can transmit the data representing the identity product of the feature data to sensor 102-2 over network 109.

In some implementations, the sensor 102-1 can transmit the data to the sensor 102-2 at a particular rate. The rate can be a value that is proportional to the overlap of the fields of view between sensor 102-1 and 102-2. Therefore, the sensor 102-1 can calculate overlapping fields of view between its field of view and the field of view of sensor 102-2 and then the sensor 102-1 can off-board the data at a rate proportional to these overlapping fields of view.

For example, during the course of standard performance by system 100, the longitudinal and lateral positions of the objects can be regularly identified and updated. These position calculations inherently encode for the velocity of objects in system 100, e.g., the rate which they move through a local coordinate space. Because the coordinate space that each sensor observes can be established, a priori, a given sensor, such as sensor 102-2, can maintain a data table that represents the coordinate spaces these sensors proximal to that given sensor, such as sensor 102-1 and sensor 102-N, can observe. Therefore, the sensors can estimate a vector of a given object in a local coordinate space and project that vector into an adjacent sensor's coordinate space. The overall set of vectors can be used as a method to establish a flow rate between coordinate spaces. In other implementations, the sensor 102-1 can propagate the list to the sensor 102-2 at a ratio between the frame rate of input media, the frame rate of outputs, the speed of the vehicles traversing through the field of view, and then the adjacency of the corresponding field of view. For example, since each sensor can maintain the coordinate space that the proximal sensors observe, then each sensor can offload the list to proximal sensors using the flow rate between coordinate spaces.

The sensor 102-2 can receive the identity product of feature data from the sensor 102-1. The sensor 102-2 can generate feature data of detected vehicle 106-1 when vehicle 106-1 enters its field of view. In response to generating the feature data, the sensor 102-2 can compare the generated feature data with the receive feature data from sensor 102-1. If the comparison results in a match or a near match within a threshold value, then the sensor 102-2 can determine that it is viewing the same vehicle 106-1 as seen by sensor 102-1. In some examples, sensor 102-2 may transmit a confirmation back to sensor 102-1 indicating that it saw the same vehicle. Then, when vehicle 106-1 exits the field of view of sensor 102-2, the sensor 102-2 can transmit the generated feature data to the next sensor down the road 105, e.g., sensor 102-3. Each sensor within system 100, e.g., sensors 102-1 through 102-N, performs this similar process when a vehicle is detected in its field of view.

During stage (E), the sensor 102-3 may detect vehicle 106-2 has entered its field of view. Then, during the time that vehicle 106-2 is within its field of view, the sensor 102-3 may generate feature data on a per frame basis, the feature data describing road objects seen in the sensor 102-3's field of view. As the sensor 102-3 generates feature data on a per frame basis, the sensor 102-3 may determine that the feature data changes on a per frame basis. The change can be based on the movement of the road object within the sensor 102-3's field of view or an introduction of new road objects within the field of view. If the sensor 102-3 notices the feature data changes on a per frame basis, the sensor 102-3 can indicate a change in position of the vehicle 106-2 to the central server 110. In some cases, a change in feature data is normal, and can indicate that the vehicle is traveling down the road in the proper direction. In other cases, some changes in feature data on a frame-to-frame basis is large, and can indicate that the vehicle has moved closer to the sensor 102-4 or farther away from the sensor 102-3. In these cases, the sensor 102-3 can determine that vehicle 106-2 has performed a lane change.

As illustrated in system 100, vehicle 106-2 travels down the general-purpose lanes and moves towards the transition lane by entering the opening lane, e.g., indicative of the dotted lines of the vehicle 106-2. The opening lane can correspond to a lane shift between the one or more general-purpose lanes and the one or more transition lanes. A vehicle, e.g., vehicle 106-2, entering the opening lane indicates to the sensors 102 and the gantry system 104 that the vehicle seeks to enter the one or more dedicated lanes. The vehicle 106-2, which may be human operated or fully autonomous, may move from one lane of the general-purpose lanes to a transition lane to access the one or more dedicate lanes. When vehicle 106-2 exits the field of view of sensor 102-3, the sensor 102-3 can transmit the latest generated feature data to the next sensor down the longitudinal line of sensors along road 105, e.g., sensor 102-4.

During stage (F), vehicle 106-2 has transitioned from the general-purpose lane to the transition lane by traveling through the opening lane. Vehicle 106-2 has entered the field of view 116 of sensor 102-4 and is now driving down the transition lane to access the one or more dedicated lanes towards the gantry system 104. However, in order to access the one or more dedicated lanes, the vehicle 106-2 has to meet the conditions set in place by the gantry system 104. As the vehicle 106-2 traverses down the transition lane, the vehicle 106-2 can decelerate in order to receive and appropriately, act on the instructions provided by the gantry system 104.

In some implementations, the sensor 102-4 can generate feature data 108-1 of the vehicle 106-2 traversing down the transition lane. The feature data 108-1 can include data that describes the vehicle 106-2, e.g., color, size, vehicle type, vehicle headway, vehicle dynamics, and the like. The feature data 108-1 can also include the raw data recorded by the sensor 102-4. Additionally, the feature data 108-1 can also include the generated feature data from each of the previous sensors, e.g., sensor 102-1 through sensor 102-3. The sensor 102-4 can provide the feature data 108-1 to the gantry system 104 over network 109.

During stage (G), the gantry system 104 can receive the feature data 108-1 from the sensor 102-4 and determine how vehicle 106-2 should proceed. The gantry system 104 can include a control unit, a display screen 107, a light indicator, and a gate. The control unit can include one or more central processing units (CPUs), one or more GPUs, and memory components. The control unit performs the processing of the sensor data and can generate instructions to provide to the vehicles traversing the transition lanes. The control unit can receive the feature data 108-1 from the sensor 102-4, and more generally, can receive feature data from other sensors, and can use the feature data 108-1 to generate instructions to provide to a vehicle 106-2 approaching the one or more dedicated lanes on the configured road 105. For example, the gantry system 104 can receive the feature data 108-1 and determine whether to activate the gate, the signal indicator, and the display screen 107.

In particular, the gantry system 104 or the control unit can open the gate to allow a vehicle access to the one or more dedicated lanes. The gantry system 104 can also close the gate before the next vehicle attempts to access the one or more dedicated lanes so only one vehicle can enter the gate at a time. The signal indicator can include one or more lights that can instruct the vehicle to enter or not enter the dedicated lanes. For example, the gantry system 104 can flash a green light on the signal indicator and open the gate to indicate that the vehicle can access the one or more dedicated lanes. In another example, the gantry system 104 can flash a red light on the signal indicator to indicate that the vehicle cannot access the one or more dedicated lanes. Lastly, the gantry system 104 can include a display screen 107 that can provide messages to the vehicle in the transition lane. The display screen 107 can display messages indicating to speed up, slow down, reach a certain speed before entering the dedicated lanes, or to not enter the dedicated lanes, to name a few examples.

In some implementations, the signal indicator and the display screen 107 of the gantry system 104 can be positioned at eye level of the vehicle. For example, the signal indicator and the display screen 107 may be placed at a height between 4 feet and 8 feet above ground. By placing the signal indicator and the display screen 107 at the eye level height of the vehicle, a driver of the non-autonomous vehicle can view their corresponding information without difficulty. In another example, by placing the signal indicator and the display screen 107 at the eye level height of the vehicle, an autonomous vehicle's sensors can obtain the information from the signal indicator and the display screen 107 and process the obtained information in order to enable the autonomous vehicle to act accordingly, e.g., do not move the car forward to access the dedicated lanes or wait until the signal indicator displays a green light and the gate opens indicating the car can proceed to access dedicated lanes.

In some implementations, the gantry system 104 can determine a type of signal and a speed notification to provide to the approaching vehicle based on characteristics derived from the provided sensor data. For example, the gantry system 104 can determine vehicle 106-2 is not moving fast enough towards the one or more dedicated lanes down the transition lane, and the gantry system 104 can display a speed warning to the vehicle via the display screen 107, indicating the vehicle 106-2 should speed up to 65 miles per hour (MPH). The gantry system 104 can instruct the vehicle 106-2 to speed up to a particular speed, e.g., 65 MPH for example, in the case that the gantry system 104 receives sensor data from sensors monitoring the dedicated lanes, e.g., sensors 102-5 and 102-6, that indicates the average speed of vehicles is traveling at 60 MPH or greater. In another example, the gantry system 104 can determine from the received sensor data that the vehicle density of the vehicles traveling along the dedicated lane is high but the vehicles are traveling at a speed greater than 65 MPH. The gantry system 104 informs vehicle 106-2 to reach the particular speed to ensure when vehicle 106-2 accesses the dedicated lanes, vehicle 106-2 does not become a hazard or impede the flow of traffic along the dedicated lanes by travelling slower than the speed of other vehicles. When the gantry system 104 receives sensor data from sensors monitoring the transition lane indicating that vehicle 106-2 has reached the desired speed, the gantry system 104 can flash the signal indicator green and open the gate to allow vehicle 106-2 access to the one or more dedicated lanes.

Additionally, the gantry system 104 can turn on a signal of the signal indicator to an illuminated state when the vehicle 106-2 approaches to indicate the vehicles actions. For example, a green illuminated state can indicate that vehicle 106-2 can access the one or more dedicated lanes. In another example, a red illuminated state can indicate that vehicle 106-2 cannot access the one or more dedicated lanes. In another example, a yellow illuminated state can indicate that the gantry system 104 is waiting for vehicle 106-2 to meet one or more predetermined conditions to provide access to the one or more dedicated lanes.

In another example, the gantry system 104 can determine that the vehicle 106-2 is unable to enter the dedicated lane based on a vehicle density of the vehicles currently moving through the dedicated lanes. In this example, the gantry system 104 can determine that vehicles within the dedicated lane have come to a halt, and as such, no further vehicles should enter the dedicated lane until traffic moves again. Similarly, the gantry system 104 can determine that the vehicle density in the one or more dedicated lanes is too high, and that another vehicle cannot be added to the dedicated lanes as this may cause further traffic jams and may even pose as a hazardous risk to other vehicles in the dedicated lanes. Thus, the gantry system 104 can display a red indicator light to the vehicle 106-2 until the vehicle density of the vehicles within the dedicated lanes drop below a threshold value. The gantry system 104 may receive sensor data from sensors monitoring the dedicated lanes on a periodic basis. When the gantry system 104 determines from the received sensor data that the vehicle density is below a threshold or traffic speed has reached a particular speed, the gantry system 104 can open the gate and turn a signal indicator green to indicate the vehicle 106-2 can access the one or more dedicated lanes.

In another example, the gantry system 104 can analyze, using the provided sensor data, an approaching vehicle's headway against a subsequent vehicle in the transition lane. If the gantry system 104 determines that a vehicle is approaching vehicle 106-2 in the transition lane from behind and is either too close or traveling faster than the vehicle 106-2, then the gantry system 104 can indicate to vehicle 106-2 to increase speed to a particular speed to be able to safely enter the dedicated lanes without being hit from behind or deteriorating traffic in the dedicated lanes any further. The gantry system 104 can determine from the feature data received from the sensors that another vehicle is approaching the vehicle 106-2 from behind in the transition lane and that the approaching vehicle is traveling faster than vehicle 106-2. Similarly, the gantry system 104 can determine that an average speed of the vehicles within the dedicated lanes is greater than the current speed of the vehicle 106-2. Consequently, the gantry system 104 can instruct via the display screen 107 that vehicle 106-2 should increase their speed to 70 MPH, for example, to ensure that the approaching vehicle from behind does not hit vehicle 106-2 and vehicle 106-2 will travel at a speed when entering the dedicated lane without deteriorating traffic in the dedicated lane.

In some implementations, the sensors can update the gantry system 104 with new sensor and/or feature data on a per frame basis. Thus, when the gantry system 104 instructs a vehicle to speed up, slow down, or reach a designated speed while traveling within the transition lane, the sensor data provided on a per frame basis by the sensors ensures that the vehicle has ample time to reach the new speed and that gantry system 104 is notified when the vehicle reaches the instructed speed. Additionally, the transition lane should be long enough such that the vehicle can either increase or decrease their speed based on instructions from the gantry system 104. Therefore, the gantry system should be able to (i) receive sensor data from the sensors regarding a vehicle traveling down the transition lane, (ii) provide instructions regarding movement of the vehicle traveling down the transition lane and approaching the gate, (iii) receive updated sensors data from the sensors indicating that the vehicle traveling down the transition lane has achieved a new velocity, and (iv) allow the vehicle access to the one or more dedicated lanes.

In some implementations, if the gantry system 104 determines that the vehicle has not met the conditions to enter the one or more dedicated lanes within a predetermined distance from the gate, the gantry system 104 can force the vehicle to exit the transition lane. For example, if the gantry system 104 has not received sensor data that indicates vehicle 106-2 has reached a set speed of 65 MPH by the time the vehicle is 50 yards or less from the gate of the gantry system 104, then the gantry system 104 can display a message to the vehicle 106-2 via the display screen 107 that reads "Please exit transition lane." Additionally or alternatively, the gantry system 104 may indicate that the vehicle 106-2 needs to exit the transition lane should the one or more dedicated lanes be congested or have a vehicle density amount greater than a threshold. Additionally, the gantry system can illuminate the light of the signal indicator to be red, indicating the vehicle cannot enter the one or more dedicated lane. At this point, the vehicle 106-2 can exit the transition lane and return to the one or more general-purpose lanes of the road 105.

During stage (H), after the gantry system 104 has raised the gate and allowed the car to enter the one or more dedicate lanes, the gantry system 104 can close access to the dedicated lane for the next vehicle approaching the gate. The gantry system 104 can close access to the dedicated lane for the next vehicle until the next vehicle has approached the gantry system 104 within a predetermined distance and has met the one or more conditions, described above, for entering the one or more dedicated lanes.

As illustrated in system 100, vehicle 106-3 can traverse down the one or more dedicated lanes. The one or more dedicated lanes can correspond to a high occupancy vehicle (HOV) lane, a special purpose lane for particular vehicles, a special purpose lane in the case of emergencies, avoiding emergencies/accidents/constructions in the general-purpose lanes, or another lane that provides an advantage for vehicles over other vehicles driving down the general-purpose lanes. In some cases, after the vehicle 106-3 has traversed down the one or more dedicated lanes, the vehicle 106-3 can move back into the general-purpose lanes.

During stage (I), the vehicle can exit the acceleration lane of the one or more dedicated lanes and merge back into the one or more general-purpose lanes. The vehicle can merge back into the one or more general-purpose lanes by avoiding oncoming traffic from the one or more general-purpose lanes. For example, vehicle 106-3 can merge back to the general-purpose lanes from the one or more dedicated lanes and avoid hitting other vehicles, such as vehicle 106-N. Afterwards, the vehicles can continue traversing down road 105.

Figure 1B:
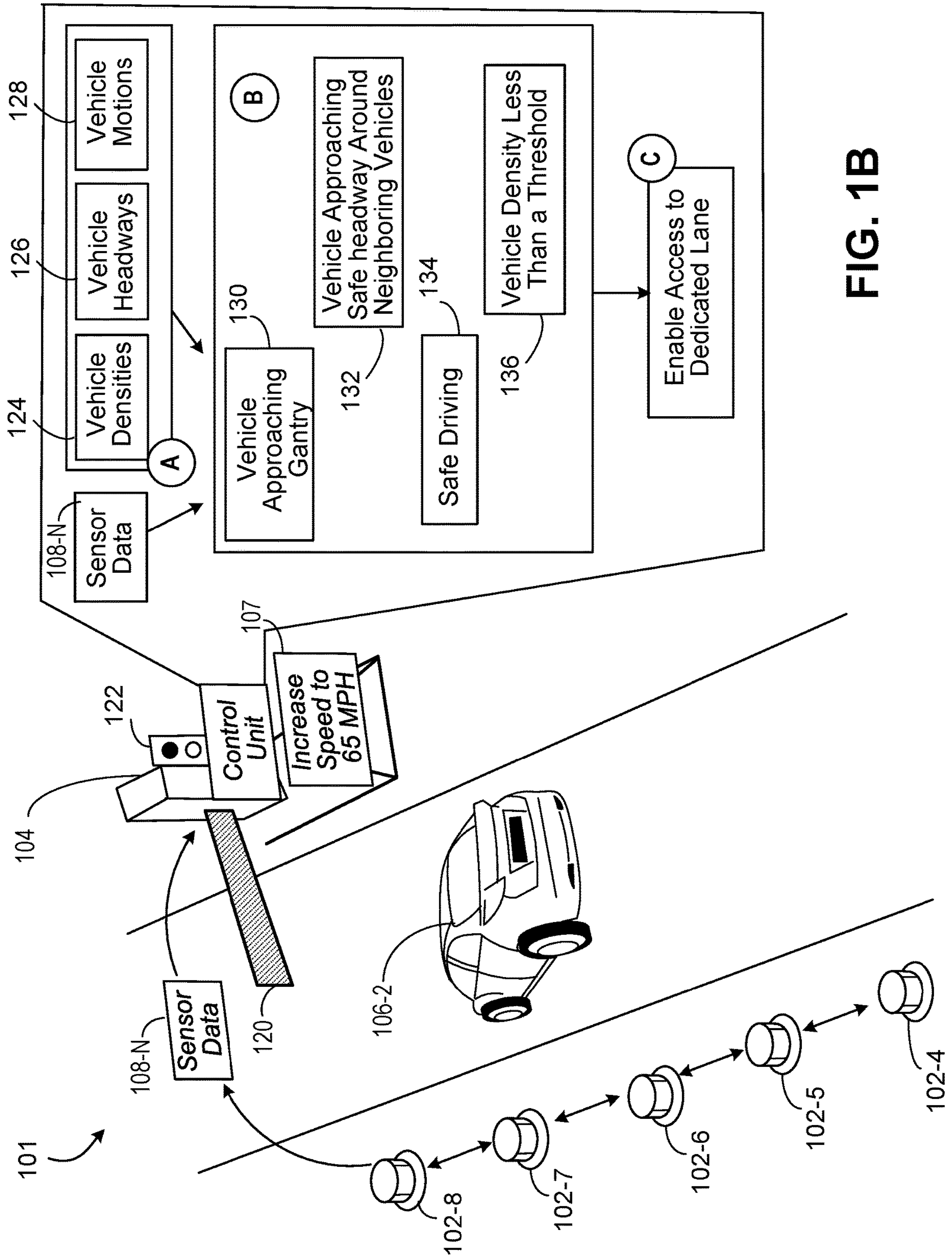

FIG. 1B is another block diagram that illustrates an example of system 101 that enables access and egress to one or more dedicated lanes. System 101 includes similar components to system 100. In particular, system 101 includes sensors 102-4 through 102-8, and a gantry system 104. The gantry system 104 includes a control unit, a gate 120, a signal indicator 122, and a display screen 107.

Generally, system 101 illustrates a vehicle 106-2 approaching the gantry system 104 by traversing down a transition lane to access one or more dedicated lanes behind the gate 120. The sensors 102-4 through 102-8 can monitor and generate sensor data of the vehicle 106-2 as the vehicle 106-2 traverses down the transition lane. As previously described with respect to system 100, the sensors in system 101 can communicate with one another and communicate directly with the gantry system 104 by transmitting sensor data over a network.

During stage (A), the gantry system 104 or the control unit can receive the sensor data 108-N from at least one of the sensors 102-4 through 102-8. For example, as vehicle 106-2 traverses down the transition lane and enters a field of view of sensors 102-4, sensor 102-4 can generate feature data regarding the detected road object in its field of view. In some implementations, sensor 102-4 can transmit the generated sensor data to the gantry system 104 on a per frame basis. In this implementation, the control unit of the gantry system 104 can monitor the characteristics of the vehicle 106-2's movement. In other implementations, sensor 102-4 can transmit the generated data to the next sensor down the line of sensors along the direction of travel of the transition lane. The next sensor as illustrated in system 101 corresponds to sensor 102-5.

Additionally, each of the sensors 102-4 through 102-8 can determine characteristics of the vehicle 106-2 and other vehicles as they enter and traverse through the sensors' fields of view. For example, and as illustrated in system 101, each of the sensors 102 can determine vehicle densities 124, vehicle headways 126, and vehicle motions 128. As previously mentioned, vehicle densities 124 or vehicle density per unit area can correspond to a measure of an amount of traffic and movement rate of the traffic in a particular area. Vehicle headways 126 or vehicle headway can correspond to a distance between a first and second vehicle measured in time or distance. Vehicle motions 128 or vehicle dynamics can corresponds to vehicle acceleration, deceleration, and velocity over a period of time.

For example, the sensors can determine the vehicle densities 124 is a low number when only one vehicle is travelling down the transition lane. The sensors can also determine the vehicle headways 126 between two vehicles on the transition lane. These sensors monitoring the vehicles traversing in the transition lane can transmit the sensor data including the vehicle densities 124, vehicle headways 126, and vehicle motions 128 on a per-frame basis. Additionally, as shown in system 100, sensors monitor the one or more dedicated lanes. Those sensors monitoring the one or more dedicated lanes can generate data indicative of vehicle densities 124, vehicle headways 126, and vehicle motions 128, and transmit this data to the gantry system 104. The gantry system 104 or the control unit can use this obtained data from the (i) sensors monitoring the transition lanes and the (ii) sensors monitoring the one or more dedicated lanes to make determinations regarding vehicles being able to access and egress the one or more dedicated lanes.

During stage (B), the control unit of the gantry system 104 can use the received sensor data 108-N, the vehicle densities 124, the vehicle headways 126, and the vehicle motions 128 to determine that vehicle 106-2 is approaching the gate 120 to access the one or more dedicated lanes 130. The input data may indicate a detection of a road actor within one or more of the sensors' fields of view. Additionally, as multiple sensors may transmit sensor data to the gantry system 104, the gantry system 104 may receive sensor data first from sensor 102-4, then sensor data from sensor 102-5, and so on. This receipt of sensor data from each of the sensors can indicate to the gantry system 104 that the vehicle is traveling down the transition lane. In some implementations, the rate at which the gantry system 104 receives the sensor data from each of the different sensors may correspond to a rate at which the vehicle is moving and approaching the gantry system 104.

The control unit of the gantry system 104 can also determine that the vehicle 106-2 is approaching the gate 120 of the gantry system 104 with a safe headway around neighboring vehicles 132. For example, based on the vehicle densities 124, the vehicle headways 126, vehicle motions 128, and the sensor data 108-N, the gantry system 104 can determine that vehicle 106-2 is maintaining a safe headway between neighboring vehicles. A safe headway can correspond to, for example, a distance of 50 feet between subsequent vehicles traveling down the transition lane. If the gantry system 104 determines that a distance of less than 50 feet, for example, is measured between subsequent vehicles, the gantry system 104 can display a message via the display screen 107 that indicates to the vehicles to increase their headway distance. This may include, for example, a front vehicle increasing speed and a rear vehicle decreasing their speed.

In other examples, the gantry system 104 can determine that the vehicle 106-2 is driving safely 134. Driving safely can correspond to the vehicle 106-2 driving under the speed limit, not exhibiting an erratic or sporadic driving behavior, maintaining lane position, and other factors, to name a few examples. If the gantry system 104 determines that the vehicle 106-2 is not driving safely from the sensor data, then the gantry system 104 can display a message to the display screen 107 indicating for the vehicle 106-2 to drive safely. If the gantry system 104 determines the vehicle 106-2 continues to drive unsafely as the vehicle 106-2 reaches a predetermined distance to the gantry system 104, the gantry system 104 can contact the authorities of unsafe and hazardous driving by vehicle 106-2.

In another example, the gantry system 104 can determine that the vehicle density is less than a threshold 136. For example, the gantry system 104 can measure the vehicle density from the sensors monitoring the transition lane and the vehicle density from the sensors monitoring the one or more dedicated lanes. If the gantry system 104 determines the vehicle density from the sensors monitoring the transition lane is greater than a threshold, the gantry system 104 can determine that these vehicles may not be able to reach their desired speed before entering the one or more dedicated lanes. In this case, the gantry system 104 can display a message via the display screen 107 to indicate that one or more vehicles need to exit the transition lane and return to the general-purpose lanes. Additionally and/or alternatively, if the gantry system 104 determines the vehicle density from the sensors monitoring the one or more dedicated lanes is greater than a threshold, then the gantry system 104 can determine that no vehicles from the transition lane can enter the one or more dedicated lanes until the vehicle density corresponding to the one or more dedicated lanes is measured to be below a threshold value. In this case, the gantry system 104 flash the signal indicator 122 as red and maintain the gate 120's closure until the gantry system 104 receives sensor data that indicates the vehicle density for the vehicles in the one or more dedicated lanes is less than a threshold value.

During stage (C), the gantry system 104 can enable vehicle 106-2's access to the one or more dedicated lanes if one or more conditions from stage (B) are met. In this case, the gantry system 104 can determine that the vehicle 106-2 is approaching the gantry system 104, the vehicle 106-2 includes a safe headway between neighboring vehicles on the transition lane, and vehicle 106-2 is driving in a safe manner. Additionally, the gantry system 104 can determine that the vehicle density from both the one or more dedicated lanes and the transition lane are less than a threshold value. In some cases, the gantry system 104 can also determine that vehicle 106-2 has reached a certain speed instructed by the gantry system 104 that enables it to access the one or more dedicated lanes.

Figure 1C:
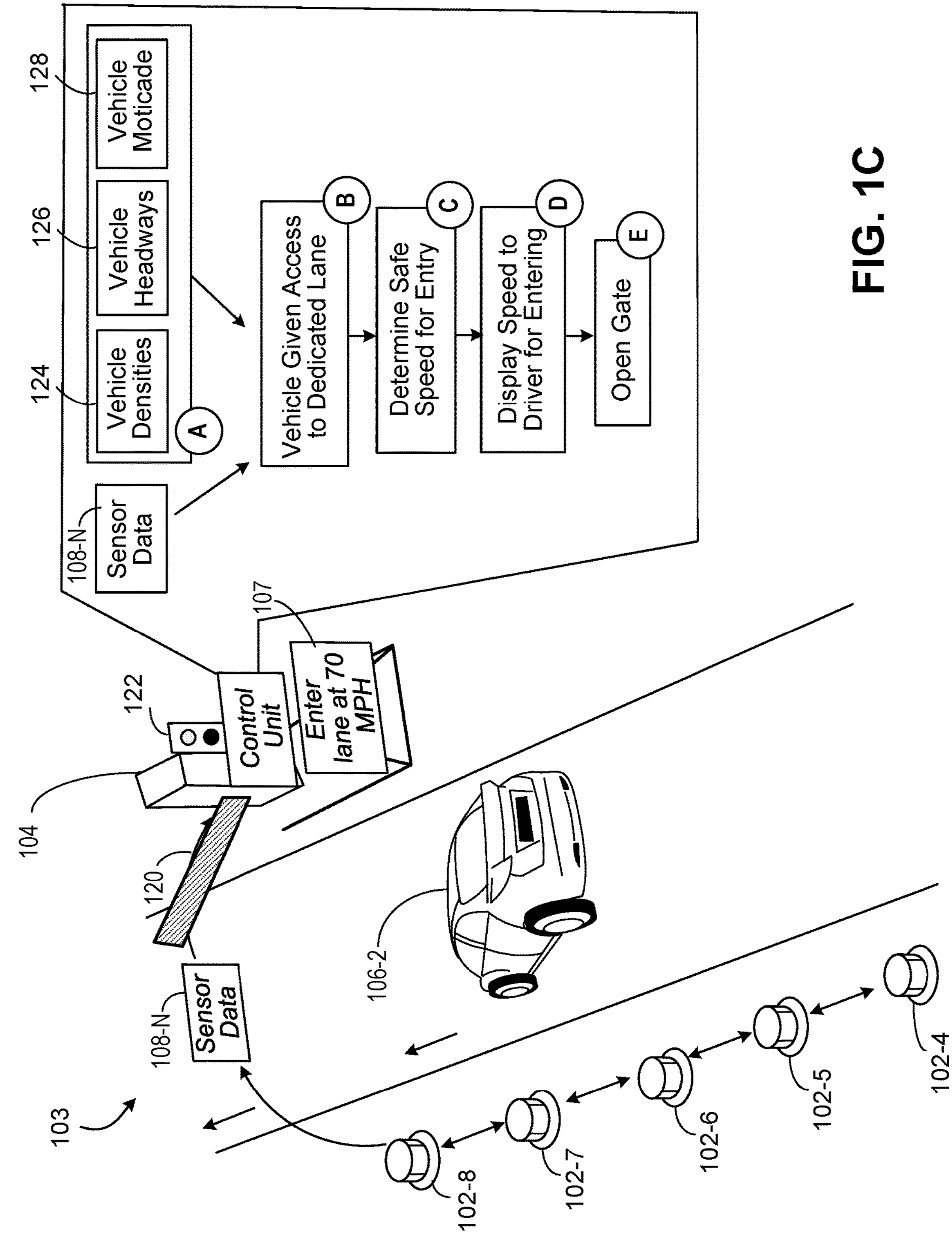

FIG. 1C is another block diagram that illustrates an example of system 103 that enables access and egress to one or more dedicated lanes. System 103 includes similar components systems 100 and 101. In particular, system 103 includes sensors 102-4 through 102-8, and a gantry system 104. The gantry system 104 includes a control unit, a gate 120, a signal indicator 122, and a display screen 107. Moreover, system 103 is a continuation of system 101.

During stage (A), the gantry system 104 can receive the sensor data 108-N from at least one of the sensors 102-4 through 102-8. Additionally, each of the sensors 102 can determine vehicle densities 124, vehicle headways 126, and vehicle motions 128 to be used to make determinations about vehicle 106-2 accessing the one or more dedicated lanes via the gantry system 104. Additionally, the sensor data 108-N and the vehicle densities 124, the vehicle headways 126, and the vehicle motions 128 may be transmitted by the sensors and received by the gantry system 104 on a frame-by-frame basis. Stage (A) of system 103 is similar to stage (A) of system 101.

During stage (B), the gantry system 104 may determine that the vehicle 106-2 has met the conditions to access the one or more dedicated lanes. In this case, the gantry system 104 can decide to provide vehicle 106-2 with access to the one or more dedicated lanes. Stage (B) of system 103 is similar to stages (B) and (C) of system 101.

During stage (C), the gantry system 104 can determine a safe speed for entry of vehicle 106-2 into the one or more dedicated lanes. The control unit of the gantry system 104 can determine a current speed of the vehicle 106-2 and the average speed of the vehicles within the one or more dedicated lanes. The control unit can compare the current speed of vehicle 106-2 to the average speed of the vehicles within the one or more dedicated lanes. If a discrepancy exists, e.g., speed difference between these values, the control unit can determine the speed at which vehicle 106-2 needs to reach before entering the one or more dedicated lanes. For example, if the control unit determines that vehicle 106-2 is traveling at 50 MPH and the average speed of the vehicles within the one or more dedicated lanes corresponds to 70 MPH, then the control unit can determine a speed the vehicle 106-2 needs to reach for entering the one or more dedicated lanes.

In this case, the control unit determines a speed the vehicle needs to reach to ensure vehicle 106-2's entry into the one or more dedicated lanes does not disrupt traffic among the other vehicles traveling along the one or more dedicated lanes. For example, the control unit may determine that vehicle 106-2 needs to reach 70 MPH before entering the one or more dedicated lanes to ensure vehicle 106-2 is traveling at the same speed average speed of the other vehicles traveling in the one or more dedicated lanes. In another example, the control unit may determine that vehicle 106-2 needs to reach a speed greater than the average speed of the vehicles traveling in the one or more dedicated lanes. The control unit may determine that the vehicle 106-2 needs to reach 75 MPH, for example, to ensure vehicle 106-2 can catch up to the other vehicles within the one or more dedicated lanes and be able to merge in with those vehicles.

During stage (D), the control unit can display the determined speed for the vehicle to enter the one or more dedicated lanes. As illustrated in system 100, the control unit can display to the display screen 107 a message that reads "ENTER LANE AT 70 MPH" before the vehicle 106-2 enters the one or more dedicated lanes. At this point, when the gate 120 opens and the signal indicator 122 light turns green, the vehicle 106-2 can accelerate to 70 MPH to enter the one or more dedicated lanes.

In some implementations, the gantry system 104 may toll individuals who do not obey the request to accelerate to a particular speed when entering the one or more dedicated lanes. For example, if the gantry system 104 determines that vehicle 106-2 does not reach 70 MPH when entering the one or more dedicated lanes by way of sensor data, the gantry system 104 may fine the vehicle 106-2. The gantry system 104 can use the captured imagery from the sensors and determine an owner of the vehicle. Based on the determined owner, the gantry system 104 can transmit a fine to an address of the owner for causing an overall deterioration to the performance of the one or more dedicated lanes by not reaching the recommended speeds. The amount of the toll may be based on a difference amount between the recommended and the actual speed of the vehicle 106-2. The greater the difference, the greater toll amount. For example, the gantry system 104 may charge a quarter or 10 cents for having a difference of 1 to 2 MPH. If the MPH is 10-15 MPH or greater, then the gantry system 104 may charge the owner of the vehicle 106-2 a particular dollar amount in tolls.

During stage (E), after the gantry system 104 has determined the speed for the vehicle 106-2 and displayed the speed on the display screen 107, the control unit of the gantry system 104 can lift the gate 120. The control unit can lift the gate 120 to allow vehicle 106-2 to access the one or more dedicated lanes. The control unit may lift the gate 120 for a predetermined time period. Alternatively, the control unit may lift the gate 120 and use sensor data to determine when the close the gate 120. For example, the control unit may determine, based on the received sensor data 108-N, that the vehicle 106-2 has moved from the transition lane to the one or more dedicated lanes. After the vehicle 106-2 has entered, the control unit can close access to the one or more dedicated lanes for the next vehicle, until the next vehicle has approached the gantry system 104 within a predetermined distance and the next vehicle has met the requirements for entering the one or more dedicated lanes.

Figure 2:
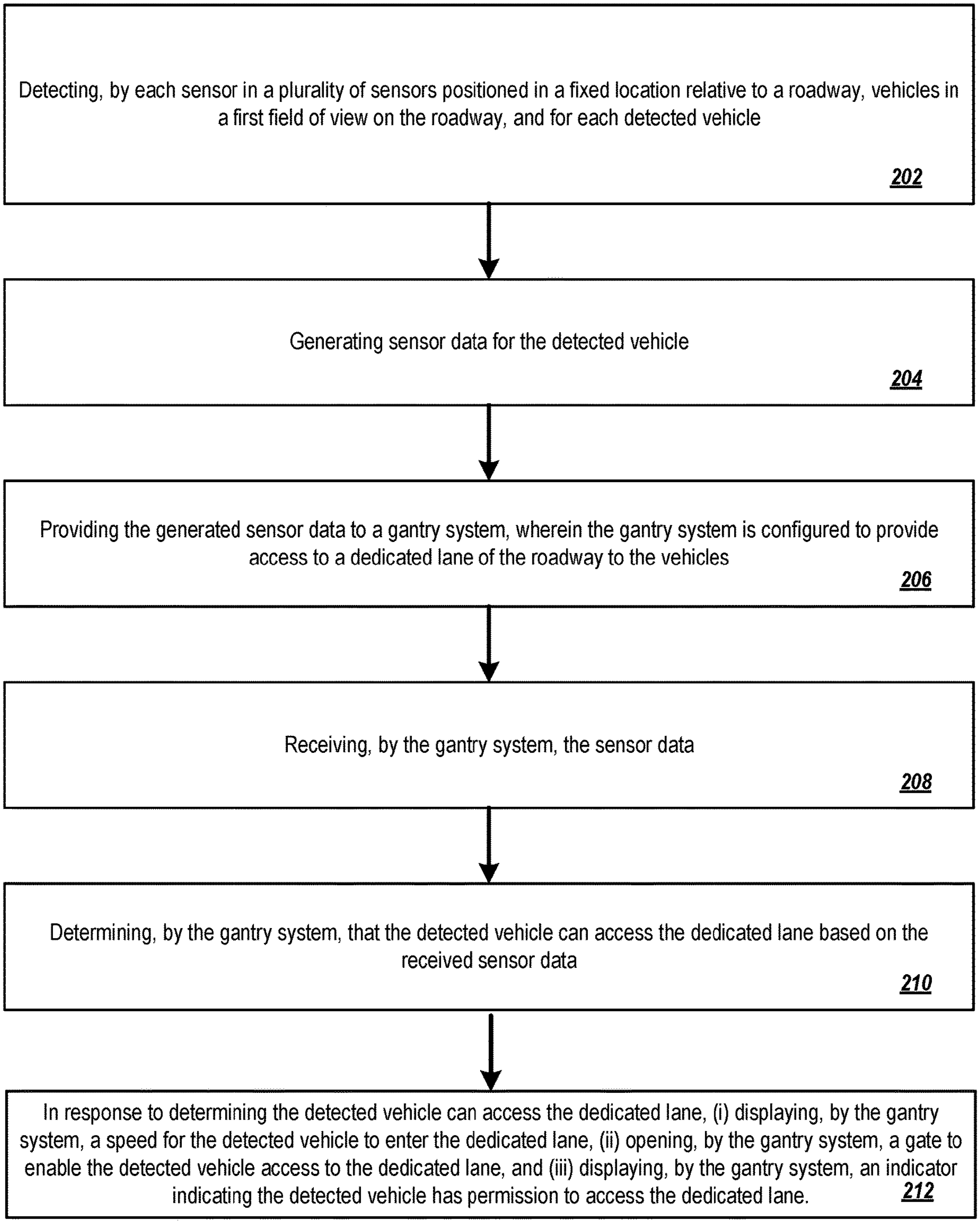
FIG. 2 is a flow diagram that illustrates an example of a process for detecting and enabling vehicles seeking to access one or more dedicated lanes using sensors.

FIG. 2 is a flow diagram that illustrates an example of a process 200 for detecting and enabling vehicles seeking to access one or more dedicated lanes using sensors. The sensors, such as sensors 102, may perform the process 200.

In the process 200, each sensor from a plurality of sensors are positioned in a fixed location relative to a roadway, and each sensor can communicate with a central server and a gantry system. Moreover, each sensor can detect vehicles in a first field of view on the roadway (202). For example, the plurality of sensors can be positioned longitudinal to the direction of traffic on the roadway. Each sensor can be placed in the ground at a predetermined distance apart from one another. Additionally, each sensor's field of view can be positioned towards a segment or area of the roadway to detect and monitor vehicles. For each detected vehicle, the sensors can perform the operations as described below. A sensor can detect a particular vehicle in its field of view. The sensor can use object detection or some form of classification to detect an object in its field of view.

For example, a sensor can generate sensor data for a detected vehicle (204). The sensor data can correspond to an identification of a vehicle type, characteristics of detected vehicle or vehicles, vehicular density per unit area, vehicle congestion, vehicle headway, and vehicle dynamics. The identification of the vehicle type can correspond to, for example, a truck, a sedan, a minivan, a hatchback, an SVU, and others. The identification of the vehicle type can be based on a size of the vehicle. Characteristics of the vehicle can include, for example, vehicle color, vehicle size, wheelbase distance, and length, height, and width of vehicle. Vehicular density per unit area can correspond to a number of vehicles measured over a particular area in traffic. Vehicular congestion can correspond to a measure of an amount of traffic and movement rate of the traffic in a particular area. Vehicle headway can correspond to a distance between a first and second vehicle in a transit system measured in time or in distance. Vehicle dynamics can include acceleration, deceleration, and velocity of one or more vehicles traveling along the prior roadways over a period of time.

Each sensor can identify features of the vehicles it detects and can use the feature data to generate the sensor data. For example, each sensor can identify features of the detected vehicles that include, for example, the vehicle color, e.g., as represented by red-green-blue (RGB) characteristics, the vehicle size, e.g., as calculated through optical characteristics, the vehicle class, e.g., as calculated through optical characteristics, and the volume of the vehicle, as calculated through optical characteristics. In one such example, a sensor can determine that a detected vehicle is the color blue, is over 100 $ft^3$ in volume, has a vehicle type of a sedan, and is a medium sized vehicle. Other examples are also possible. The sensor can also determine one or more characteristics of the vehicle, such as its rate of speed, the distance away from the sensor, the vehicle's direction of travel, and a number of individuals found in the vehicle, to name a few examples. Based on the generated feature data, the sensor can generate sensor data that includes an identification of a vehicle type, characteristics of detected vehicle or vehicles, vehicular density per unit area, vehicle congestion, vehicle headway, and vehicle dynamics, to name a few examples.

The sensors can transmit the generated sensor data to the next sensor in the direction of traffic. For example, when a sensor generates sensor data of the feature data, the sensor can generate an identity product of the feature data and can transmit data representing the identity product of the feature data when the corresponding detected vehicle has exited the sensor's field of view. The data representing the identity product of the feature data can include, for example, a data structure, a matrix, or a link to data stored in a database. The next sensor can receive the data representing the identity product of the feature data and can compare the data representing the identity product of the feature data to new feature data generated by the next sensor. The next sensor performs this comparison to determine whether it is seeing the same vehicle as seen by the previous sensor, e.g., the sensor that transmitted the data representing the identity product of the feature data to the next sensor.

In some implementations, each sensor can detect vehicles on a portion of the roadway. For example, each sensor monitoring a portion of the roadway can (i) detect vehicles in a first field of view on a general purpose lane of the roadway, (ii) detect vehicles in a second field of view on an opening lane of the roadway, (iii) detect vehicles in a third field of view on a transition lane of the roadway, and (iv) detect vehicles in a fourth field of view on a dedicated lane of the roadway. The sensors may detect different vehicles on the roadway and detect the same vehicles traversing down the roadway.

In some implementations, the sensors can communicate with a central server. The sensors can transmit the generated sensor data and the identified feature data to the central server over a network when the sensors are configured to assist the central server in determining a new roadway configuration. The central server can determine various characteristics regarding the vehicles traversing the roadway to determine a specific and new roadway configuration. For example, the central server can determine (i) prevailing speeds of the vehicles traveling along the roadway over a particular period of time, (ii) historic speeds of the vehicles traveling along the roadway over a particular period of time, (iii) vehicle dynamics of the vehicles traveling along the prior roadway over a particular period of time, and (iv) a visibility of the vehicles traveling along the roadway over a particular period of time. In response to determining each of the data points (i)-(iv) using the received sensor and feature data, the central server can determine a specific roadway configuration to enable vehicles to safely access a dedicated lane.

The specific roadway configuration can correspond to a new roadway or a modification to an existing roadway. The central server can generate the new roadway configuration to enable vehicles to more easily divert from a general purpose lane to access and egress one or more dedicated lanes. The central server can analyze the received data from the sensors to gain an understanding of how vehicles traverse along a roadway, which can include, speed at which vehicles travel, how vehicles change lanes, and how vehicles maneuver through other vehicles on the roadway. Based on this analysis, the central server can generate a new roadway configuration that reduces traffic congestion and minimizes hazards associated with lane conditions. The central server can generate a new roadway configuration that includes one or more general purpose lanes, one or more opening lanes, one or more transition lanes, and one or more dedicated lanes, along with each of their corresponding characteristics. The central server can then deploy the new roadway configuration by modifying an existing roadway or generating blueprints of plans for a new roadway to be used for construction of a new road. The construction of the new roadway can not only include the different lanes, but also include the deployment of a gantry system and the deployment of sensors in a longitudinal manner along the newly deployed roadway. Once the roadway, sensors, and gantry system have been deployed and constructed, the new roadway is ready for use by vehicles.

As illustrated in system 100, vehicles can travel down general-purpose lanes and move towards transition lanes by entering opening lanes in order to access one or more dedicated lanes. The sensors can detect these vehicles, and their corresponding movements, generate sensor data, and transmit the generated sensor data to each sensor and transmit the data to a gantry system. The gantry system can allow the detected vehicle access the one or more dedicated lanes when the generated sensor data provided by the sensors indicates that the detected vehicle has met the conditions set in place by the gantry system.

The sensor can provide the generated sensor data to a gantry system, wherein the gantry system is configured to provide access to a dedicated lane of the roadway to the vehicles (206). The sensor can provide the generated sensor data and feature data to the gantry system over a network. Each sensor can provide generated sensor data and feature data to the gantry system over a network on a periodic basis, when a vehicle has been detected in its field of view, and when the detected vehicle has exited the sensor's field of view.

The gantry system can receive the sensor data (208). The gantry system can receive the acquired sensor data (and feature data) from each of the sensors and can take actions to decide how a vehicle can proceed. The gantry system can include a control unit, a display screen, a light indicator, and a gate. The gantry system's control unit can include one or more CPUs, one or more GPUs, and memory components for performing the processing of the sensor data and feature data, and can generate instructions to provide to the vehicles traversing the transition lanes. For example, the gantry system can receive the feature and sensor data from each of the sensors and determine whether to activate the gate, the signal indicator, and the display screen for the detected vehicle traversing the transition lane.

The gantry system can determine that the detected vehicle can access the dedicated lane based on the received sensor data (210). For example, when the gantry system receives the generated sensor and feature data from each of (or one of) the sensors, the gantry system can allow a vehicle to access the one or more dedicated lanes by opening the gate and closing the gate before a subsequent vehicle tries to access the gate. The signal indicator can include one or more lights that can instruct the vehicle to enter or not enter the dedicated lanes. The display screen can display messages to vehicles traveling down the transition lane to access the one or more dedicated lanes. These messages can include, for example, speed up, slow down, reach a certain speed before entering the dedicated lanes, or to not enter the dedicated lanes, to name a few examples.

The gantry system can determine a type of signal, a speed notification, and whether to enable the vehicle access to the one or more dedicated lanes based on characteristics derived from the provided sensor data. For example, the gantry system can determine the vehicles speed from the sensor data, and determine whether the vehicle needs to accelerate to a new speed or decelerate to a new speed before opening the gate. The gantry system can determine vehicle congestion of vehicles currently traversing in the dedicated lane, and can indicate whether the detected traveling traversing the transition lane can access the dedicated lanes based on the congestion of vehicles currently in the dedicated lane. In another example, the gantry system can analyze the vehicle density in the dedicated lanes to determine whether the vehicle traversing the transition lane can access the dedicated lanes. In other examples, the gantry system can analyze an approaching vehicle's headway against a subsequent vehicle in the transition lane. If the approaching vehicle is too close or traveling faster than the subsequent vehicle in the transition lane, then the gantry system will not allow the subsequent vehicle to access the dedicated lane until the approaching vehicle slows down and/or the subsequent vehicle speeds up, creating a greater gap between the two vehicles. Other examples are also possible.

In some implementations, the sensors can update the gantry system with new sensor and/or feature data on a per frame basis. Thus, when the gantry system instructs a vehicle to speed up, slow down, or reach a designated speed while traveling within the transition lane, the sensor data provided on a per frame basis by the sensors ensures that the vehicle has ample time to reach the new speed and that gantry system is notified when the vehicle reaches the instructed speed. Additionally, the transition lane should be long enough such that the vehicle can either increase or decrease their speed based on instructions from the gantry system 104. Once the gantry system has determined from the sensor data that the detected vehicle traversing the transition lane has met its conditions, the gantry system can enable the vehicle access to the dedicated lanes.

In response to determining that the detected vehicle can access the dedicated lane, the gantry system can (i) display a speed for the detected vehicle to enter the dedicated lane, (ii) open a gate to enable the detected vehicle access to the dedicated lane, and (iii) display an indicator indicating that the detected vehicle has permission to access the dedicated lane (212). For example, the gantry system can determine characteristics from the received sensor data. This can include that a detected vehicle is approaching in a transition lane. The gantry system can also determine from the received sensor data that the detected vehicle approaching the gantry system includes a headway with one or more other surrounding vehicles that enables safe acceleration to a prevailing speed in the dedicated lane. The gantry system can determine from the received sensor data that the detected vehicle approaching the gantry system and other vehicles in the dedicated lane are driving in a safe and non-erratic fashion. Additionally, the gantry system can determine from the received sensor data that the vehicle density of one or more other vehicles in the dedicated lane of the roadway is less than a threshold amount. Based on determining each of the aforementioned data points, the gantry system can display a light of the indicator to indicate that the detected vehicle has permission to access the dedicated lane. The gantry system can then raise the gate and provide on the display a speed at which the vehicle can travel at to reach the dedicated lanes.

In another example, the gantry system can display a speed for the dedicated vehicle to enter the dedicated lane based on the received sensor data. In response to the gantry system displaying the light of the indicator enabling the vehicle access to the dedicated lane, the gantry system can determine the speed for the detected vehicle to enter the dedicated lane based on the headway of the detected vehicle with the one or more surrounding vehicles that enables the safe acceleration of the vehicle to the prevailing speed. The gantry system may determine that the detected vehicle should increase speed or decrease speed to a particular speed to have a safe headway with the one or more surrounding vehicles. In response, the gantry system can display the particular speed for the detected vehicle to enter the one or more dedicated lanes of the roadway.

In another example, the gantry system can determine whether to open the gate to enable the detected vehicle access to the dedicated lane based on the received sensor data. For example, the gantry system can determine that the detected vehicle approaching the gantry system in a transition lane of the roadway is traveling at a speed greater than a threshold value, e.g., traveling 75 MPH in a 60 MPH. The gantry system can then determine that the detected vehicle cannot access the dedicated lane unless the vehicle meets a speed equivalent to the threshold value. The gantry system can display the speed equivalent to the threshold value for the detected vehicle to reach while traversing the transition lane. For example, the gantry system can display 60 MPH on the display indicator for the detected vehicle. Then, the gantry system may receive additional sensor data from the plurality of sensors, the additional sensor data indicating a new speed of the detected vehicle matches or is below the speed equivalent to the threshold value while traveling in the transition lane. For example, the additional sensor data can indicate that the detected vehicle has reduced their speed to 59 MPH while traversing the transition lane. In response, the gantry system can open the gate to enable the detected vehicle access to the dedicated lane based on the additional received sensor data.

In another example, the gantry system can determine whether to open the gate to enable the detected vehicle access to the dedicated lane based on the received sensor data. For example, the gantry system can detect a second vehicle approaching the gantry system, the second vehicle is behind the detected vehicle in a transition lane of the roadway. The gantry system can determine a first speed of the detected vehicle and a second speed of the second vehicle. The gantry system can determine that the second speed is greater than the first speed by a threshold amount. For example, the first vehicle can travel at 45 MPH and the second vehicle can travel at 60 MPH. The gantry system can determine that the second vehicle is traveling 15 MPH faster than the first vehicle, and the 15 MPH is greater than a threshold amount of 5 MPH. Then, the gantry system can display a third speed for the detected vehicle to meet to be able to access the dedicated lane. For example, the detected vehicle would need to reach anywhere between 55 MPH to 65 MPH to be within a threshold amount of 5 MPH from the speed of the behind vehicle, e.g., 60 MPH. Then, the gantry system can receive additional sensor data from the plurality of sensors, the additional sensor data indicating a new speed of the detected vehicle matches, is above, or is below the third speed within a threshold value. In response, the gantry system can open the gate to enable the detected vehicle access to the dedicated lanes. The gantry system closes the gate behind the detected vehicle to ensure the second vehicle meets certain conditions before accessing the dedicated lanes.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising:

a central server;

a gantry system configured to provide access to a dedicated lane of a roadway to vehicles;

a plurality of sensor devices positioned in a fixed location relative to the roadway, wherein a sensor device from the plurality of devices is configured to:

detect vehicles in a first field of view on the roadway, and for each detected vehicle:

generate sensor data for the detected vehicle; and provide the generated sensor data to the gantry system;

wherein the gantry system is configured to:

receive, from the sensor device, the generated sensor data;

determine, using the generated sensor data, that the detected vehicle approaching the gantry system is (i) in a transition lane of the roadway and (ii) is traveling at a speed greater than a threshold value;

determine the detected vehicle cannot access the dedicated lane based on the speed of the detected vehicle;

display the speed equivalent to the threshold value for the detected vehicle;

receive, from another sensor device located a distance from the sensor device on the transition roadway, additional sensor data, the additional sensor data indicating a new speed of the detected vehicle that satisfies the threshold value while traveling in the transition lane;

in response to determining the new speed of the detected vehicle satisfies the threshold value, determine, using the additional sensor data, that the detected vehicle can access the dedicated lane; and in response to determining the detected vehicle can access the dedicated lane, (i) display, on a display screen of the gantry system, a speed for the detected vehicle to enter the dedicated lane, (ii) open a gate to enable the detected vehicle access to the dedicated lane, and (iii) display, on the display screen, an indicator indicating the detected vehicle has permission to access the dedicated lane.

2. The system of claim 1, wherein the roadway comprises one or more of a general purpose lane, an opening lane, a transition lane, and the dedicated lane.

3. The system of claim 1, further comprising:

the sensor device of the plurality of devices is configured to:

acquire sensor data of the vehicles traveling along a prior roadway; and transmit the acquired sensor data to a central server;

wherein the central server is configured to:

receive the acquired sensor data from each sensor of the plurality of sensors;

determine from the received sensor data:

prevailing speeds of the vehicles traveling along the prior roadway over a period of time, historic speeds of the vehicles traveling along the prior roadway over the period of time, vehicle dynamics of the vehicles traveling along the prior roadway over the period of time, and a visibility of the plurality of sensors to view an entire prior roadway; and in response, determine a specific configuration of the roadway based on the prevailing speeds, the historic speeds, the vehicle dynamics, and the visibility of the plurality of sensors of the one or more vehicles on the prior roadway.

4. The system of claim 1, wherein the sensor device of the plurality of sensor devices is configured to detect vehicles in a first field of view on the roadway further comprises:

detect the vehicles in the first field of view on a general purpose lane of the roadway;

detect the vehicles in a second field of view on an opening lane of the roadway;

detect the vehicles in a third field of view on a transition lane of the roadway; and detect the vehicles in a fourth field of view on a dedicated lane of the roadway.

5. The system of claim 4, wherein each sensor of the plurality of sensors:

determine vehicle densities of the vehicles in each of the first, second, third, and fourth fields of view;

determine vehicle headways of the vehicles in each of the first, second, third, and fourth fields of view; and determine vehicle motions of the vehicles in the fourth field of view corresponds to normal vehicular movement based on a threshold, the threshold determined using prior vehicle dynamics and prior historic speeds of the vehicles.

6. The system of claim 1, wherein the gantry system comprises a gate, a signal indicator, and a speed indicator.

7. The system of claim 6, wherein the gantry system is configured to display the indicator indicating the detected vehicle has permission to access the dedicated lane further comprises:

based on the received sensor data, the gantry system is further configured to:

determine the detected vehicle is approaching the gantry system in a transition lane;

determine the detected vehicle approaching the gantry system includes a headway with one or more other surrounding vehicles that enables safe acceleration to a prevailing speed in the dedicated lane;

determine the detected vehicle approaching the gantry system and other vehicles in the dedicated lane are driving in a safe fashion; and determine a vehicle density of one or more other vehicles in a dedicated lane of the roadway is less than a threshold amount; and in response, display a light of the indicator indicating the detected vehicle has permission to access the dedicated lane.

8. The system of claim 7, wherein the gantry system is configured to display the speed for the detected vehicle to enter the dedicated lane further comprises:

based on the received sensor data, the gantry system is configured to:

in response to displays the light of the indicator, determine the speed for the detected vehicle to enter the dedicated lane based on the headway of the detected vehicle with the one or more surrounding vehicles that enables the safe acceleration of the vehicle to the prevailing speed; and display the speed for the detected vehicle to enter the dedicated lane of the roadway.

9. The system of claim 1, wherein the gantry system is configured to:

based on the received sensor data:

detect a second vehicle approaching the gantry system, wherein the second vehicle is behind the detected vehicle in a transition lane of the roadway;

determine a first speed of the detected vehicle;

determine a second speed of the second vehicle;

determine the second speed is greater than the first speed by a threshold amount; and display a third speed for the detected vehicle to meet to be able to access the dedicated lane of the roadway;

receive additional sensor data from the plurality of sensors, the additional sensor data indicating a new speed of the detected vehicle matches, is above, or is below the third speed within a threshold value; and open the gate to enable the detected vehicle access to the dedicated lane.

10. A computer-implemented method comprising:

detecting, by a sensor device in a plurality of sensor devices positioned in a fixed location relative to a roadway, vehicles in a first field of view on the roadway, and for each detected vehicle:

generating sensor data for the detected vehicle;

providing the generated sensor data to a gantry system, wherein the gantry system is configured to provide access to a dedicated lane of the roadway to the vehicles;

receiving, by the gantry system, the generated sensor data;

determining, by the gantry system and using the generated sensor data, that the detected vehicle approaching the gantry system is (i) in a transition lane of the roadway and (ii) is traveling at a speed greater than a threshold value;

determining, by the gantry system, the detected vehicle cannot access the dedicated lane based on the speed of the detected vehicle;

displaying, by the gantry system, the speed equivalent to the threshold value for the detected vehicle;

receiving, by the gantry system and from another sensor device located a distance from the sensor device on the transition roadway, additional sensor data, the additional sensor data indicating a new speed of the detected vehicle that satisfies the threshold value while traveling in the transition lane;

in response to determining the new speed of the vehicle satisfies the threshold value, determining, using the additional sensor data, that the detected vehicle can access the dedicated lane; and in response to determining the detected vehicle can access the dedicated lane, (i) displaying, on a display screen of the gantry system, a speed for the detected vehicle to enter the dedicated lane, (ii) opening, by the gantry system, a gate to enable the detected vehicle access to the dedicated lane, and (iii) displaying, by the gantry system, an indicator indicating the detected vehicle has permission to access the dedicated lane.

11. The computer-implemented method of claim 10, wherein the roadway comprises one or more of a general purpose lane, an opening lane, a transition lane, and the dedicated lane.

12. The computer-implemented method of claim 10, further comprising:

acquiring, by the sensor device, sensor data of the vehicles traveling along a prior roadway;

transmitting, by the sensor device, the acquired sensor data to a central server;

receiving, by the central server, the acquired sensor data from each sensor device of the plurality of sensor devices;

determining, by the central server, using the acquired sensor data: (i) prevailing speeds of the vehicles traveling along the prior roadway over a period of time, (ii) historic speeds of the vehicles traveling along the prior roadway over the period of time, (iii) vehicle dynamics of the vehicles traveling along the prior roadway over the period of time, and (iv) a visibility of the plurality of sensors to view an entire prior roadway; and in response, determining, by the central server, a specific configuration of the roadway based on the prevailing speeds, the historic speeds, the vehicle dynamics, and the visibility of the plurality of sensor devices of the one or more vehicles on the prior roadway.

13. The computer-implemented method of claim 10, wherein detecting the vehicles in a first field of view on the roadway further comprises:

detecting the vehicles in the first field of view on a general purpose lane of the roadway;

detecting the vehicles in a second field of view on an opening lane of the roadway;

detecting the vehicles in a third field of view on a transition lane of the roadway; and detecting the vehicles in a fourth field of view on a dedicated lane of the roadway.

14. The computer-implemented method of claim 13, wherein detecting the vehicles in a first field of view on the roadway further comprises:

determining vehicle densities of the vehicles in each of the first, second, third, and fourth fields of view;

determining vehicle headways of the vehicles in each of the first, second, third, and fourth fields of view; and determining vehicle motions of the vehicles in the fourth field of view corresponds to normal vehicular movement based on a threshold, the threshold determined using prior vehicle dynamics and prior historic speeds of the vehicles.

15. The computer-implemented method of claim 10, wherein the gantry system comprises a gate, a signal indicator, and a speed indicator.

16. The computer-implemented method of claim 15, wherein displaying the indicator indicating the detected vehicle has permission to access the dedicated lane further comprises:

based on the received sensor data:

determining, by the gantry system, the detected vehicle is approaching the gantry system in a transition lane;

determining, by the gantry system, the detected vehicle approaching the gantry system includes a headway with one or more other surrounding vehicles that enables safe acceleration to a prevailing speed in the dedicated lane;

determining, by the gantry system, the detected vehicle approaching the gantry system and other vehicles in the dedicated lane are driving in a safe fashion; and determining, by the gantry system, a vehicle density of one or more other vehicles in a dedicated lane of the roadway is less than a threshold amount; and in response, displaying a light of the indicator indicating the detected vehicle has permission to access the dedicated lane.

17. The computer-implemented method of claim 16, wherein displaying the speed for the detected vehicle to enter the dedicated lane further comprises:

based on the received sensor data:

in response to displaying the light of the indicator, determining, by the gantry system, the speed for the detected vehicle to enter the dedicated lane based on the headway of the detected vehicle with the one or more surrounding vehicles that enables the safe acceleration of the vehicle to the prevailing speed; and displaying, by the gantry system, the speed for the detected vehicle to enter the dedicated lane of the roadway.

18. One or more non-transitory machine-readable media storing instructions that, when executed by one or more processing devices, cause the one or more processing devices to perform operations comprising:

detecting, by each sensor device in a plurality of sensor devices positioned in a fixed location relative to a roadway, vehicles in a first field of view on the roadway, and for each detected vehicle:

generating sensor data for the detected vehicle;

providing the generated sensor data to a gantry system, wherein the gantry system is configured to provide access to a dedicated lane of the roadway to the vehicles;

receiving, by the gantry system, the generated sensor data;

determining, by the gantry system and using the generated sensor data, that the detected vehicle approaching the gantry system is (i) in a transition lane of the roadway and (ii) is traveling at a speed greater than a threshold value;

determining, by the gantry system, the detected vehicle cannot access the dedicated lane based on the speed of the detected vehicle;

displaying, by the gantry system, the speed equivalent to the threshold value for the detected vehicle;

receiving, by the gantry system and from another sensor device located a distance from the sensor device on the transition roadway, additional sensor data, the additional sensor data indicating a new speed of the detected vehicle that satisfies the threshold value while traveling in the transition lane;

in response to determining the new speed of the vehicle satisfies the threshold value, determining, using the additional sensor data, that the detected vehicle can access the dedicated lane; and in response to determining the detected vehicle can access the dedicated lane, (i) displaying, on a display screen of the gantry system, a speed for the detected vehicle to enter the dedicated lane, (ii) opening, by the gantry system, a gate to enable the detected vehicle access to the dedicated lane, and (iii) displaying, by the gantry system, an indicator indicating the detected vehicle has permission to access the dedicated lane.

19. The system of claim 1, wherein the gantry system is configured to:

in response to opening the gate to enable the detected vehicle access to the dedicated lane, receive sensor data indicating the detected vehicle has traversed the transition roadway past the gate of the gantry system; and close the gate of the gantry system to prevent access for one or more other vehicles subsequently traversing the dedicated lane.

* * * * *